US010262244B2

(12) United States Patent
Yamaguchi et al.

(10) Patent No.: US 10,262,244 B2
(45) Date of Patent: Apr. 16, 2019

(54) IMAGE EVALUATION METHOD

(71) Applicant: PS Solutions Corp., Tokyo (JP)

(72) Inventors: Norio Yamaguchi, Tokyo (JP); Yohei Sakai, Tokyo (JP); Takashi Togami, Tokyo (JP); Kyosuke Yamamoto, Tokyo (JP); Yasutaka Kosugi, Tokyo (JP)

(73) Assignee: PS SOLUTIONS CORP., Tokyo (JP)

( * ) Notice: Subject to any disclaimer, the term of this patent is extended or adjusted under 35 U.S.C. 154(b) by 0 days.

(21) Appl. No.: 15/760,561

(22) PCT Filed: Sep. 20, 2016

(86) PCT No.: PCT/JP2016/077728
§ 371 (c)(1),
(2) Date: Mar. 15, 2018

(87) PCT Pub. No.: WO2017/047814
PCT Pub. Date: Mar. 23, 2017

(65) Prior Publication Data
US 2018/0276504 A1 Sep. 27, 2018

(30) Foreign Application Priority Data
Sep. 18, 2015 (JP) .................................. 2015-185843

(51) Int. Cl.
*G06K 9/68* (2006.01)
*G06F 16/583* (2019.01)
(Continued)

(52) U.S. Cl.
CPC ................. *G06K 9/68* (2013.01); *A01G 7/00* (2013.01); *G06F 16/00* (2019.01);
(Continued)

(58) Field of Classification Search
CPC ......... G06T 1/0014; G06T 2207/30188; G06T 2207/30168; G06T 7/0002
(Continued)

(56) References Cited

U.S. PATENT DOCUMENTS 6,014,451 A 1/2000 Berry et al.
7,142,708 B2 * 11/2006 Sakai ...................... G06T 7/001
382/149
(Continued)

FOREIGN PATENT DOCUMENTS

JP 2012-080790 A 4/2012
JP 2013-047867 A 3/2013
(Continued)

OTHER PUBLICATIONS

Japanese Notification of Reasons for Refusal Office Action dated Aug. 15, 2017 regarding Japanese Patent Application No. 2015-185843 corresponding to U.S. Appl. No. 15/760,561(3 pages) with English Translation (3 pages).
(Continued)

*Primary Examiner* — Yosef Kassa
(74) *Attorney, Agent, or Firm* — Lewis Roca Rothgerber Christie LLP

(57) ABSTRACT

The purpose of the present invention is to improve evaluation accuracy of a photographed image when an event occurs. An image evaluation method according to the present invention includes steps, which are carried out by a server, for: storing, in a plurality of storage units, organism images each corresponding to a mode of an organism and outbreak environment information indicating the range of environment information suited for a mode of an organism; receiving a photographed image transmitted from a portable terminal; receiving environment information measured by a sensor terminal from the sensor terminal; retrieving organ-
(Continued)

ism images similar to the received photographed image among a plurality of organism images and assigning scores to names each related to the mode of an organism corresponding to the retrieved organism image; extracting names each related to the mode of an organism associated with outbreak environment information including the environment information received from the sensor terminal; assigning a weight to the scores of the extracted names; and transmitting a name, having the highest score among the plurality of scores as an evaluation result name, to the portable terminal that has transmitted the photographed image.

3 Claims, 20 Drawing Sheets

(51) Int. Cl.
    *G06F 16/58*     (2019.01)
    *A01G 7/00*     (2006.01)
    *G06T 1/00*     (2006.01)
    *G06F 17/30*     (2006.01)
    *G06K 9/32*     (2006.01)
    *G06F 16/00*     (2019.01)

(52) U.S. Cl.
    CPC ...... *G06F 16/5838* (2019.01); *G06F 16/5866* (2019.01); *G06F 17/30256* (2013.01); *G06F 17/30268* (2013.01); *G06K 9/3241* (2013.01); *G06T 1/00* (2013.01)

(58) Field of Classification Search
    USPC ....................................................... 382/110
    See application file for complete search history.

(56) References Cited

U.S. PATENT DOCUMENTS

| | | | |
|---|---|---|---|
| 7,417,731 B1 * | 8/2008 | Masten | A01M 7/0089 356/328 |
| 7,715,659 B2 * | 5/2010 | Zhao | G06K 9/00288 382/305 |
| 7,853,046 B2 * | 12/2010 | Sharony | A01K 29/00 356/603 |
| 8,369,566 B2 * | 2/2013 | Sinzinger | G01G 17/08 356/4.03 |
| 8,755,570 B2 * | 6/2014 | Gomas | G06K 9/6209 382/110 |
| 2013/0050192 A1 | 2/2013 | Kira et al. | |
| 2013/0136312 A1 | 5/2013 | Tseng et al. | |

FOREIGN PATENT DOCUMENTS

| | | |
|---|---|---|
| JP | 2013-111078 A | 6/2013 |
| JP | 2014-085114 A | 5/2014 |
| JP | 5733158 B | 6/2015 |
| JP | 2015-204788 A | 11/2015 |

OTHER PUBLICATIONS

International Search Report dated Nov. 22, 2016 for corresponding PCT Application No. PCT/JP2016/077728 (3 pages) with English Translation (2 pages).

Written Opinion dated Nov. 22, 2016 for corresponding PCT Application No. PCT/JP2016/077728 (4 pages) with English Translation (6 pages).

Information Statement, Presentation of Publications and the like dated May 8, 2017 regarding Japanese Patent Application No. 2015-185843 (2 pages).

* cited by examiner

FIG. 7A

| USER ID | NAME | EMAIL ADDRESS | SENSOR ID | ... |
|---|---|---|---|---|
| P0001 | USER 1 | abcd@efg.com | S00004、00012、... | ... |
| P0002 | USER 2 | 1234@xvz.ne.jp | S00102、S00215、... | ... |
| ... | ... | ... | ... | ... |

FIG. 7B

| SENSOR ID | SENSOR POSITION | AGRICULTURAL FIELD ID | CROP ID | CURRENT GROWTH STAGE | LOWER LIMIT EVALUATION VALUE | RECORD 1 (MEASUREMENT TIME, GROWTH STAGE, AMBIENT TEMPERATURE, HUMIDITY, SOIL TEMPERATURE, SOIL MOISTURE CONTENT, SUNSHINE DURATION, $CO_2$, ....) | RECORD 2 (MEASUREMENT TIME, GROWTH PERIOD, ATMOSPHERIC TEMPERATURE, HUMIDITY, SOIL TEMPERATURE, SOIL MOISTURE CONTENT, DAY LENGTH, $CO_2$, ....) | ... |
|---|---|---|---|---|---|---|---|---|
| S00001 | 36.36, 138.895 | F0542 | C0622 | 2 | 4 | | | ... |
| S00002 | 37.21, 136.442 | F0021 | C0124 | 1 | 3 | | | ... |
| ... | ... | ... | ... | ... | ... | ... | ... | ... |

FIG. 7C

| CROP ID | GROWTH STAGE 1 ((EVALUATION VALUE 1), (EVALUATION VALUE 2), (EVALUATION VALUE 3), (EVALUATION VALUE 4), (EVALUATION VALUE 5)) | GROWTH STAGE 2 (EVALUATION VALUE 1, EVALUATION VALUE 2, EVALUATION VALUE 3, EVALUATION VALUE 4, EVALUATION VALUE 5) | ... |
|---|---|---|---|
| C0001 | ((~12°C, 38°C~), (12~17°C, 32~38°C), (17~20°C, 28~32°C), (20~23°C, 24~28°C), (23~24°C)) | ... | ... |
| C0002 | ... | ... | ... |
| ... | ... | ... | ... |

FIG. 7D

| SENSOR ID | EVALUATION HISTORY (GROWTH DURATION, EVALUATION VALUE) |
|---|---|
| S00001 | ..., (20110410~10110930, 4), (20120402~10121010, 4), ... |
| S00002 | ... |
| ... | ... |

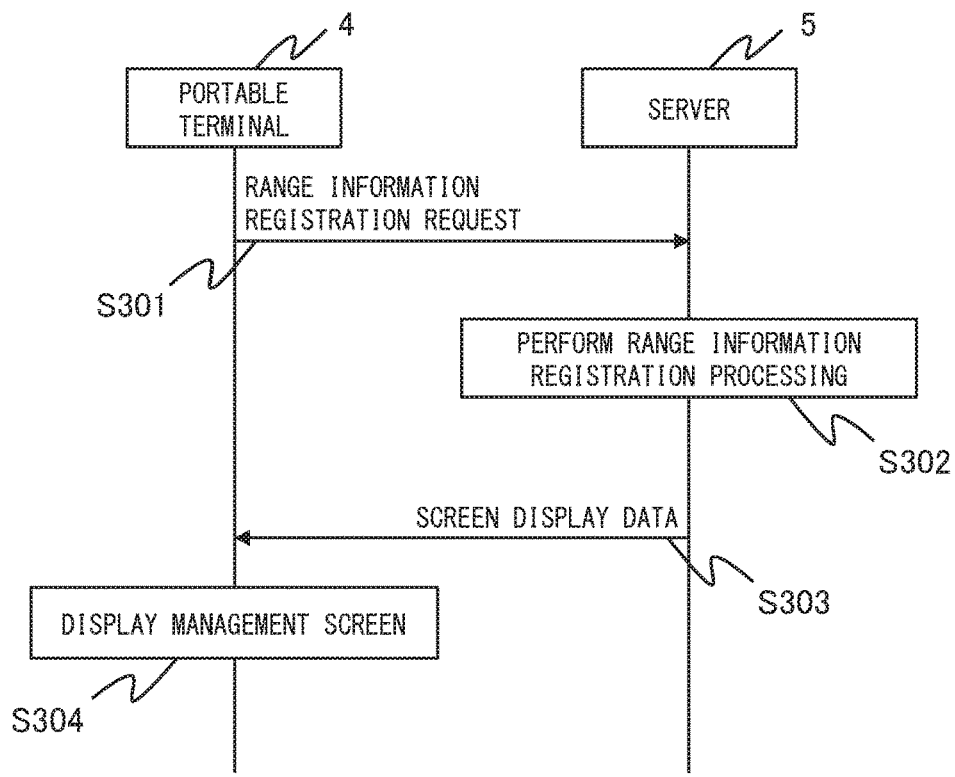
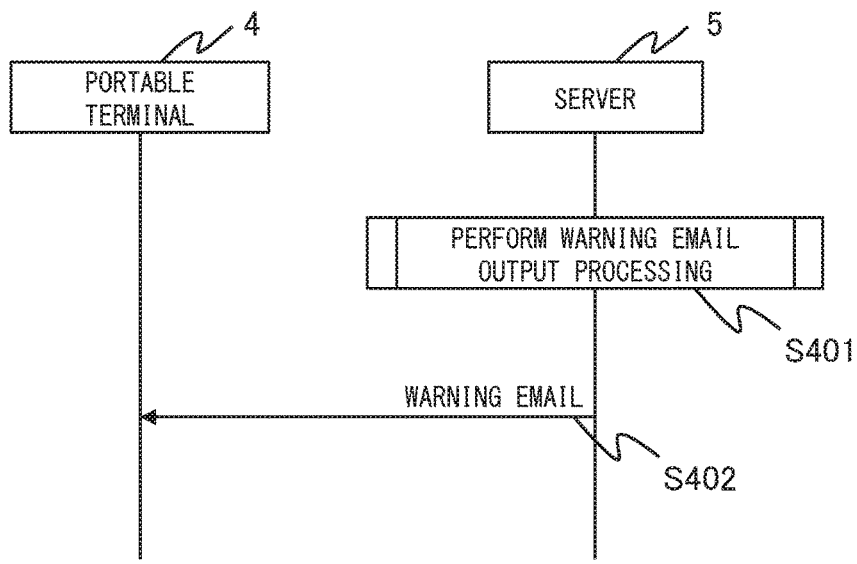

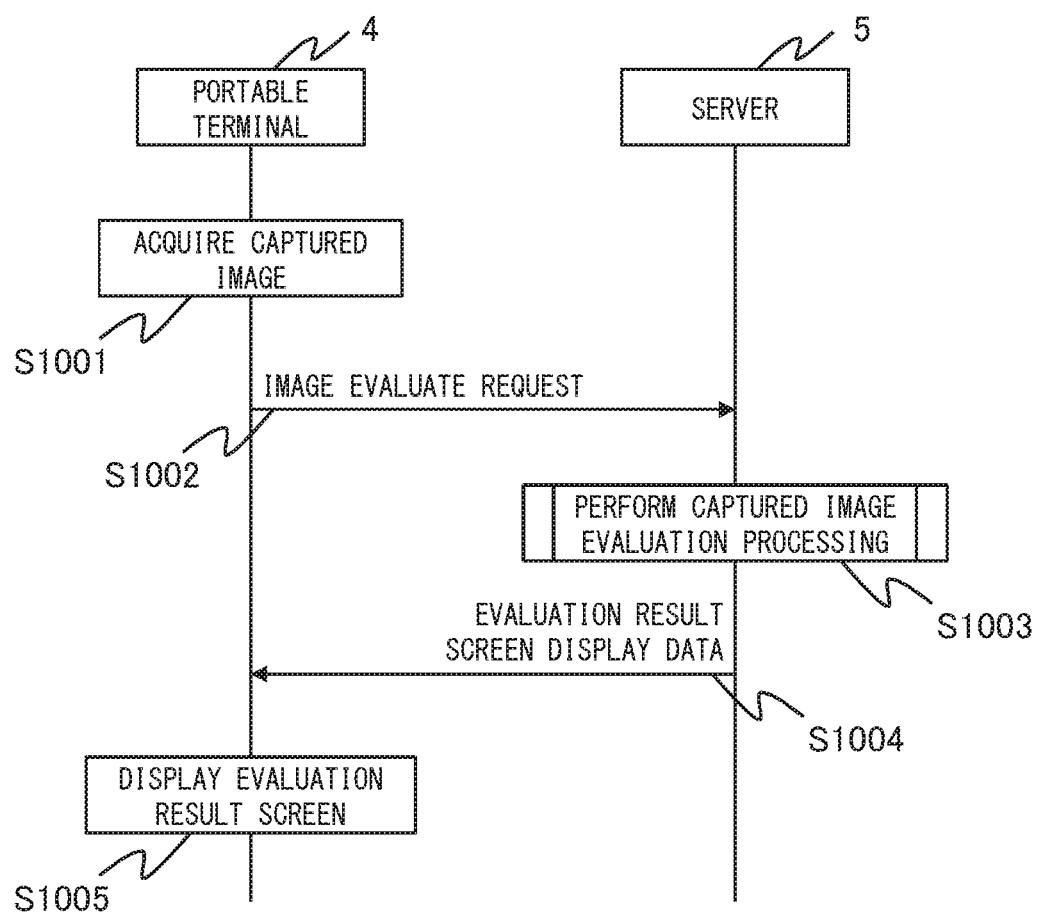

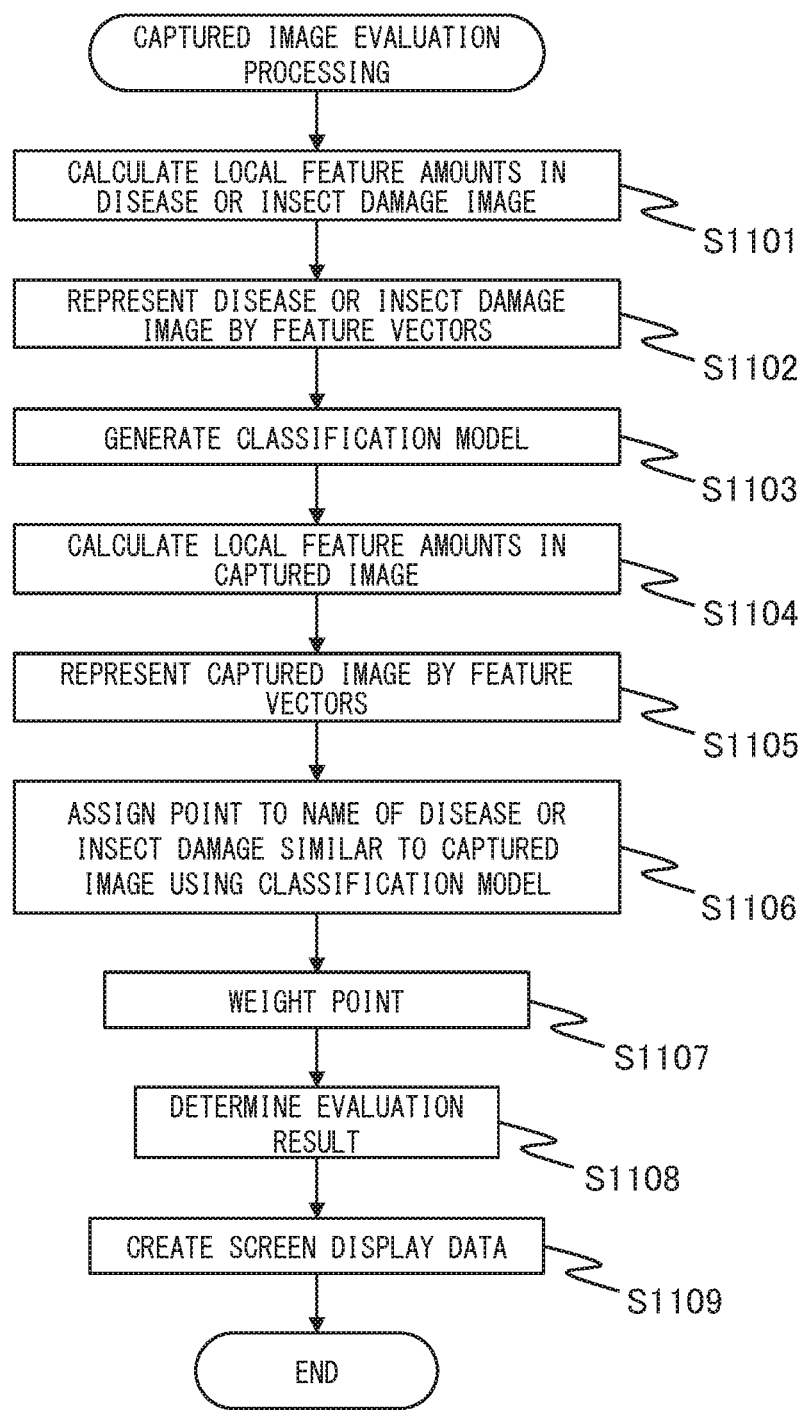

IMAGE EVALUATION METHOD

CROSS-REFERENCE TO RELATED APPLICATION(S)

This application is a National Phase Patent Application and claims the priority of International Application Number PCT/JP2016/077728, filed on Sep. 20, 2016, which claims priority of Japanese Patent Application Number 2015-185843, filed Sep. 18, 2015, the entire contents of all of which are incorporated herein by reference.

TECHNICAL FIELD

Embodiments discussed in the present specification relates to an image evaluation method for a captured image.

BACKGROUND

In recent years, a disease and insect damage search system which searches for the name of disease or insect damage based on, e.g., crop name and symptom input information or captured image information of an agricultural field for breeding a crop is known as a system which automatically searches for an insect pest inhabiting a crop or symptoms of a disease of the crop.

Patent literature 1, for example, discloses a plant disease identification system including an image capture unit, an image processing unit, and a phytopathological database which stores the name of a specific plant disease and image information representing the characteristics of the specific disease in association with each other. In the identification system, first, the image capture unit acquires cultivated plant image information, and the image processing unit analyzes the cultivated plant image information acquired by the image capture unit to acquire image information representing a zone suspected to be diseased. The image processing unit then compares the acquired image information of the zone suspected to be diseased with the image information of the characteristics of the disease in the phytopathological database. When the image information of the zone suspected to be diseased matches the image information of the characteristics of the disease in the phytopathological database, the image processing unit acquires the name of the corresponding specific plant disease as a disease identification result.

CITATIONS LIST

Patent Literature

Patent literature 1: Japanese Unexamined Patent Publication (Kokai) No. 2013-111078

SUMMARY

However, in such a conventional disease and insect damage evaluation system using image search, since an image is classified based on only image information representing disease or insect damage accumulated in advance, the classification accuracy may dramatically degrade depending on the differences in the direction in which an image is captured, the lightness, the resolution, and the like.

The image evaluation method has been made to solve such a conventional problem, and has as its object to provide an image evaluation method which can improve the accuracy of evaluation of a captured image.

According to an aspect of an image evaluation method, there is provided an image evaluation method using a server for communicating with a portable terminal and a sensor terminal located in an agricultural field. The server including a storage unit. The method including the steps of, by the server, storing in the storage unit, living organism images corresponding to respective aspects of a living organism, and pieces of occurrence environmental information representing ranges of environmental information suitable for the aspects of the living organism, receiving a captured image transmitted from the portable terminal, receiving the environmental information measured by the sensor terminal from the sensor terminal, searching for a living organism image similar to the received captured image of the living organism images and assigning points to names related to the aspect of the living organism corresponding to the found living organism image, weighting the points of the names related to the aspect of the living organism, associated with the occurrence environmental information comprising the environmental information received from the sensor terminal, by extracting the names, and transmitting a name having a highest point of the points to the portable terminal having transmitted the captured image as an evaluation result name.

According to an aspect of the image evaluation method, wherein in the step of weighting, the server extracts the names related to the aspect of the living organism, associated with the occurrence environmental information comprising the environmental information received from a sensor terminal near an image capture position of the portable terminal when the aspect of the living organism is captured by the portable terminal.

According to an aspect of the image evaluation method, further comprising the step of, by the server, storing in the storage unit, the names related to the aspect of the living organism, in association with an agricultural field recognized to have the aspect of the living organism, wherein in the step of weighting, the server extracts the names related to the aspect of the living organism recognized in a different agricultural field around the agricultural field in which the sensor terminal near the image capture position is located, and further weights the points of the extracted names.

The image evaluation method can improve the accuracy of evaluation of a captured image.

BRIEF DESCRIPTION OF DRAWINGS

FIG. 7A is a table illustrating an exemplary data structure of a user management table.

FIG. 7B is a table illustrating an exemplary data structure of a sensor management table.

FIG. 7C is a table illustrating an exemplary data structure of a range management table.

FIG. 7D is a table illustrating an exemplary data structure of an evaluation history table.

FIG. 10 is a chart illustrating still another exemplary operation sequence associated with the agricultural management system 1.

FIG. 11 is a chart illustrating still another exemplary operation sequence associated with the agricultural management system 1.

FIG. 19 is a chart illustrating still another exemplary operation sequence associated with the agricultural management system 1.

FIG. 20 is a flowchart illustrating exemplary captured image evaluation processing.

DESCRIPTION OF EMBODIMENTS

Various embodiments of the present invention will be described below with reference to the drawings. However, it should be noted that the technical scope of the present invention is not limited to these embodiments and encompasses the invention described in the scope of claims and its equivalents.

Figure 1:
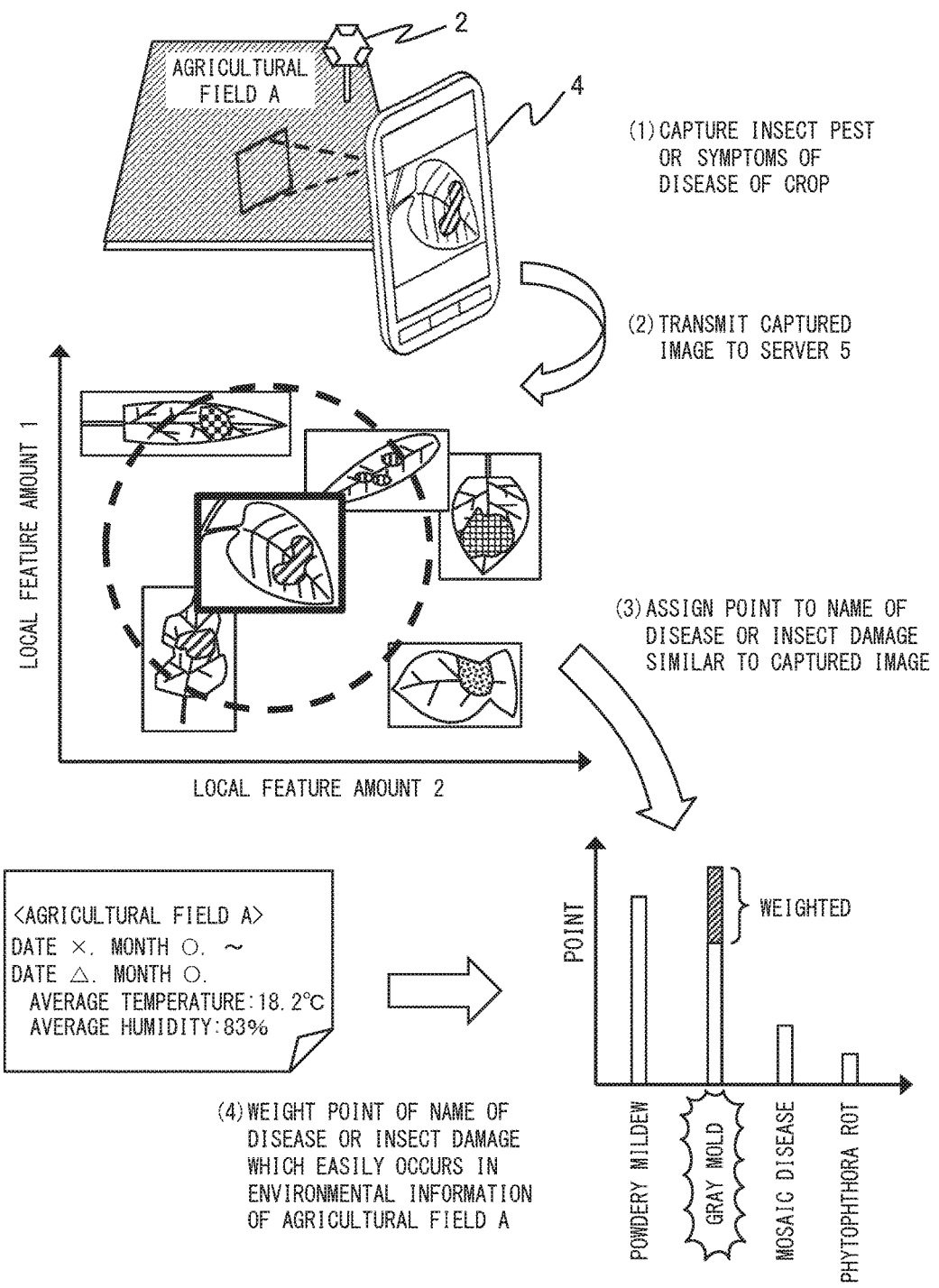
FIG. 1 is a schematic diagram for explaining an outline of an agricultural management system 1.

FIG. 1 is a schematic diagram for explaining an outline of an image evaluation system. The image evaluation system includes a sensor terminal 2 located for each agricultural field, a portable terminal 4 owned by each user who runs the corresponding agricultural field, and a server 5 which communicates with the portable terminal 4.

In the image evaluation system, the server 5 searches for a living organism image similar to a captured image transmitted from the portable terminal 4 and transmits a name related to the aspect of a living organism corresponding to the found living organism image to the portable terminal 4 as an evaluation result name. Examples of the living organism image may include images of living organisms such as plants, animals, and insects, and images of symptoms of diseases of plants including, e.g., crops, and examples of the name related to the aspect of a living organism may include the names of living organisms such as the names of plants, animals, and insects, and the names of diseases. The name of an insect pest or a disease corresponding to a captured image of an insect pest or a captured image of symptoms of a disease of a crop is searched for, and the found name of an insect pest or a disease is transmitted to the portable terminal 4 as an evaluation result name. The portable terminal 4 is implemented as a multifunctional mobile phone (so-called "smartphone"), but it may also be implemented as, e.g., a mobile phone (so-called "feature phone"), a PDA (Personal Digital Assistant), a portable game machine, a portable music player, or a tablet PC. An image evaluation system which searches for the name of an insect pest or a disease corresponding to a captured image of an insect pest or a captured image of symptoms of a disease of a crop and transmits the found name of an insect pest or a disease to the portable terminal 4 as an evaluation result name will be taken as an example below. An insect pest or a crop disease will sometimes be referred to as disease or insect damage hereinafter, and the name of an insect pest or a disease will sometimes be referred to as the name of disease or insect damage hereinafter.

First, an image capture function built into the portable terminal 4 is used to capture an insect pest inhabiting an agricultural field A run by a user who owns the portable terminal 4, or symptoms of a disease of a crop bred in the agricultural field A (1). The portable terminal 4 transmits the captured image to the server 5 (2).

The server 5 stores disease or insect damage images corresponding to respective types of disease or insect damage, and occurrence environmental information representing the range of environmental information in which these types of disease or insect damage easily occur. The environmental information in which disease or insect damage easily occurs exemplifies environmental information suitable for the aspect of a living organism. The disease or insect damage image is an image obtained by capturing actual disease or insect damage and is stored in the server 5 in association with the name of disease or insect damage evaluated by an agricultural expert or the like. The environmental information means data representing environmental factors such as the ambient temperature, the relative humidity, the soil temperature, the soil moisture content, the amount of solar radiation, the soil electrical conductivity, the soil pH level, the wind direction and speed, the saturation deficit, the dew-point temperature, the water level, the water temperature, and $CO_2$ measured by the sensor terminal 2 located in each agricultural field, and precipitation information acquired from an external server. The occurrence environmental information means data representing, e.g., the range of environmental information or the conditions of an agricultural field in which disease or insect damage easily occurs, and the occurrence environmental information of rice blast, for example, includes an ambient temperature range of 15° C. to 25° C. and a leaf wetting time of 8 or more hours.

The server 5 receives the captured image transmitted from the portable terminal 4. The server 5 searches for a disease or insect damage image similar to the captured image received from the portable terminal 4 among the stored disease or insect damage images and assigns points to the names of respective types of disease or insect damage based on the found disease or insect damage image (3). First, the server 5 uses, e.g., the SURF (Speeded Up Robust Features) method to extract feature points from each stored disease or insect damage image to calculate a local feature amount for each feature point. The server 5 represents the calculated local feature amounts using feature vectors such as Fisher vectors and generates a classification model for the feature vectors using machine learning such as Random Forest. The server 5 extracts feature points from the captured image transmitted from the portable terminal 4, calculates local feature amounts for the feature points, and represents the calculated local feature amounts using feature vectors. Using the feature vectors and the classification model for the captured image, a disease or insect damage image similar to the captured image transmitted from the portable terminal 4 is searched for, and a point is assigned to the name of each type of disease or insect damage corresponding to the found disease or insect damage image.

The classification model uses, e.g., decision trees in Random Forest. The point means, e.g., the number of votes for the name of disease or insect damage corresponding to a disease or insect damage image decided for each decision tree in Random Forest.

The server 5 receives from the sensor terminal 2, environmental information measured by the sensor terminal 2. The server 5 specifies environmental information in the agricultural field A received from the sensor terminal 2 and evaluates occurrence environmental information including the specified environmental information. The server 5 extracts the name of disease or insect damage associated with the occurrence environmental information determined to include the specified environmental information and weights a point corresponding to the extracted name of disease or insect damage (4).

The server 5 transmits the name of disease or insect damage corresponding to the highest point among points corresponding to the names of respective types of disease or insect damage to the portable terminal 4 as an evaluation result name. Thus, the user transmits an image of disease or insect damage captured by the portable terminal 4 to the server 5, in order to know, as an evaluation result name, the name of disease or insect damage that is based on image classification using the captured image of disease or insect damage and is adapted to environmental information in an agricultural field run by him or her.

As described above, the image evaluation system can search for disease or insect damage based not only on image information representing disease or insect damage accumulated in advance, but also on environmental information in an agricultural field, thus improving the accuracy of evaluation of a captured image of disease or insect damage.

The above description with reference to FIG. 1 is merely to foster an understanding of details of the present invention. More specifically, the present invention may be carried out in each following embodiment and by various modifications without substantially departing from the principles of the present invention. All such modifications fall within the scope of disclosure of the present invention and the present specification.

Figure 2:
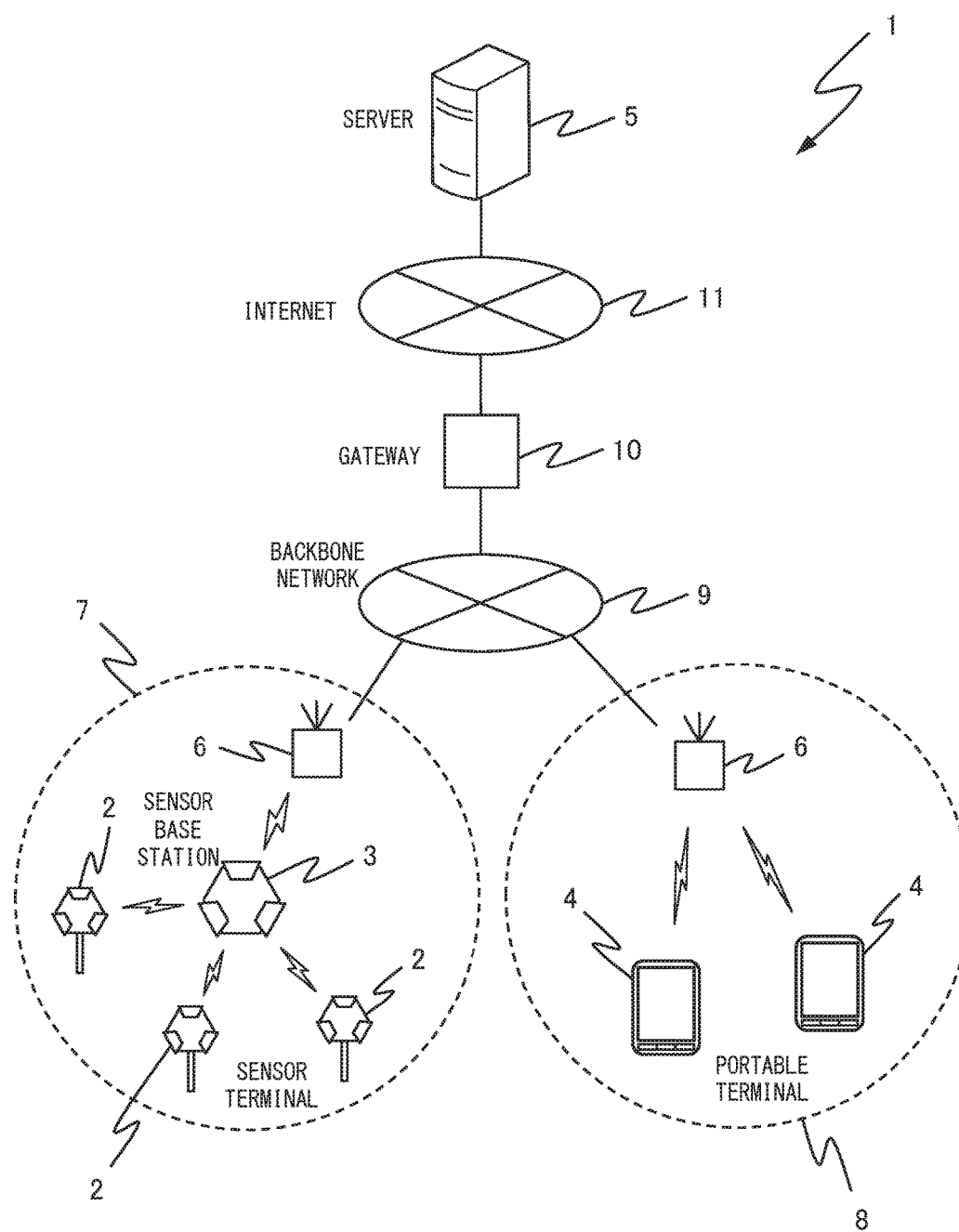
FIG. 2 is a block diagram illustrating an exemplary schematic architecture of the agricultural management system 1.

FIG. 2 is a block diagram illustrating an exemplary schematic architecture of an agricultural management system 1.

The agricultural management system 1 includes one or more sensor terminals 2, a sensor base station 3, portable terminals 4, and a server 5. The agricultural management system 1 exemplifies an image evaluation system. The sensor terminal or sensor terminals 2 and the sensor base station 3 are connected to each other via a sensor network 7. The sensor terminals 2 and the server 5 are connected to each other via a communication network and via, e.g., the sensor network 7, the sensor base station 3, a base station 6, a backbone network 9, a gateway 10, and the Internet 11. The agricultural management system 1 may even include sensor base stations 3 in correspondence with the number of sensor terminals 2. The portable terminals 4 and a base station 6 are connected to each other via a wireless communication network 8. The portable terminals 4 and the server 5 are connected to each other via a communication network and via, e.g., the wireless communication network 8, the base station 6, the backbone network 9, the gateway 10, and the Internet 11.

The base station 6 serves as a wireless device which connects the sensor base station 3 and the backbone network 9 to each other, connects the portable terminals 4 to each other, or connects the portable terminals 4 and the backbone network 9 to each other, and a plurality of base stations 6 are connected to the backbone network 9.

Figure 3:
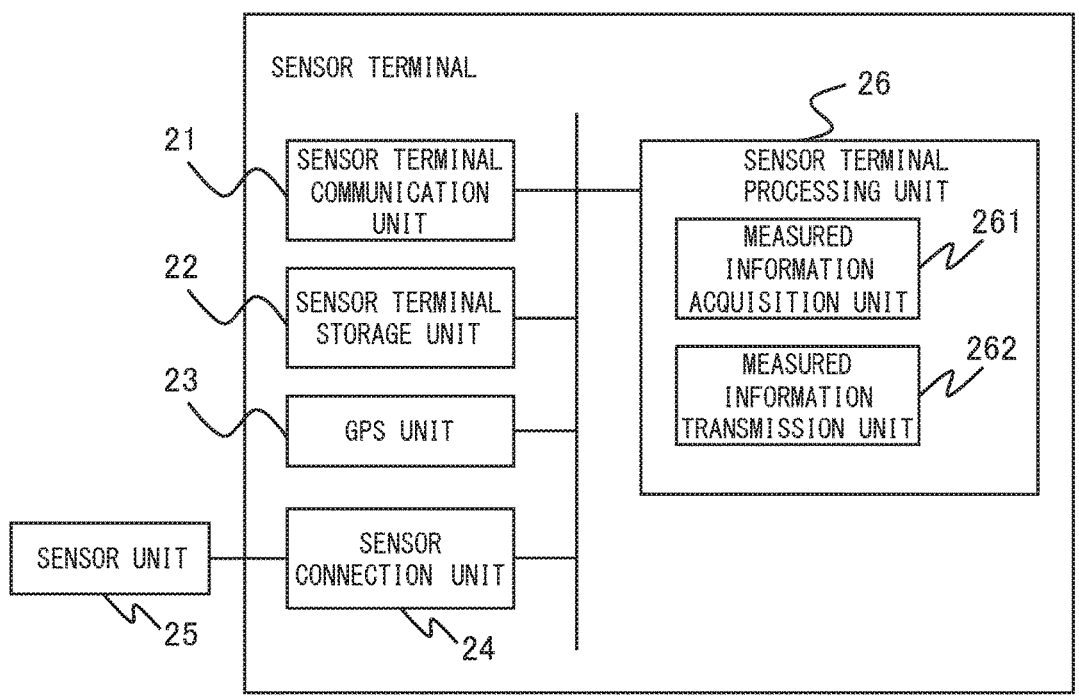
FIG. 3 is a block diagram illustrating an exemplary schematic configuration of a sensor terminal 2.

FIG. 3 is a block diagram illustrating an exemplary schematic configuration of the sensor terminal 2.

The sensor terminal 2 acquires environmental information representing measured environmental factors, transmits the environmental information, and the like. Therefore, the sensor terminal 2 includes a sensor terminal communication unit 21, a sensor terminal storage unit 22, a GPS (Global Positioning System) unit 23, a sensor connection unit 24, a sensor unit 25, and a sensor terminal processing unit 26.

The sensor terminal communication unit 21 includes a communication interface circuit, including an antenna mainly having a 920-MHz sensitive band, and connects the sensor terminal 2 to the sensor network 7. The sensor terminal communication unit 21 uses a specific channel to wirelessly communicate with the sensor base station 3 based on, e.g., the specified low-power wireless scheme. The frequency band of the sensor terminal communication unit 21 is not limited to the above-mentioned one. The sensor terminal communication unit 21 transmits environmental information supplied from the sensor terminal processing unit 26 to the sensor base station 3.

The sensor terminal storage unit 22 includes, e.g., a semiconductor memory. The sensor terminal storage unit 22 stores, e.g., driver programs, operating system programs, and data used in processing by the sensor terminal processing unit 26. For example, the sensor terminal storage unit 22 stores, as the driver programs, a wireless communication device driver program for controlling the sensor terminal communication unit 21, a GPS driver program for controlling the GPS unit 23, a sensor driver program for controlling the sensor unit 25, and the like. The sensor terminal storage unit 22 further stores, as the operating system programs, a wireless control program for executing, e.g., the specified low-power wireless scheme, and the like. The sensor terminal storage unit 22 further stores, as the data, environmental information representing environmental factors measured by the sensor unit 25.

The GPS unit 23 includes a GPS circuit, including an antenna mainly having a 1.5-GHz sensitive band, and receives a GPS signal from a GPS satellite (not illustrated). The GPS unit 23 decodes the GPS signal to acquire time instant information and the like. The GPS unit 23 calculates the pseudo-distance from the GPS satellite to the sensor terminal 2 based on the time instant information and the like and solves simultaneous equations obtained by substituting this pseudo-distance to detect the position (e.g., the latitude, the longitude, and the altitude) of the sensor terminal 2. The GPS unit 23 associates positional information representing the detected position and the acquired time instant information with each other and periodically outputs them to the sensor terminal processing unit 26.

The sensor connection unit 24 includes a sensor terminal to be connected to the sensor unit 25 and is connected to the sensor unit 25 for measuring one or more types of environmental factors.

The sensor unit 25 includes various sensors for measuring environmental factors such as the ambient temperature, the relative humidity, the soil temperature, the soil moisture content, the amount of solar radiation, the soil electrical conductivity, the soil pH level, the wind direction and speed, the saturation deficit, the dew-point temperature, the water level, the water temperature, and $CO_2$. The sensor unit 25 includes at least one of, e.g., an ambient temperature sensor for measuring the ambient temperature, a relative humidity sensor for measuring the humidity, a soil temperature sensor for measuring the soil temperature, a soil moisture sensor for measuring the soil moisture content, a solar radiation sensor for measuring the amount of solar radiation, a soil EC (Electrical Conductivity) sensor for measuring the soil electrical conductivity, a soil pH sensor for measuring the soil pH level, wind direction and speed sensors, a dew-point temperature sensor, a water level sensor, a water temperature sensor, and a $CO_2$ sensor.

The sensor terminal processing unit 26 includes one or more processors and their peripheral circuits. The sensor terminal processing unit 26 performs centralized control over the operation of the entire sensor terminal 2 and serves as, e.g., a CPU (Central Processing Unit). The sensor terminal processing unit 26 controls the operations of, e.g., the sensor terminal communication unit 21, the GPS unit 23, and the sensor unit 25 to perform various processes of the sensor terminal 2 in an appropriate order in accordance with, e.g., the programs stored in the sensor terminal storage unit 22. The sensor terminal processing unit 26 performs processing based on the programs (e.g., driver programs and operating system programs) stored in the sensor terminal storage unit 22.

The sensor terminal processing unit 26 includes a measured information acquisition unit 261 and a measured information transmission unit 262. Each of these units of the sensor terminal processing unit 26 serves as a functional module implemented by a program executed on the processor of the sensor terminal processing unit 26. Alternatively, each of these units of the sensor terminal processing unit 26 may be implemented in the sensor terminal 2 as an independent integrated circuit, microprocessor, or firmware.

Figure 4:
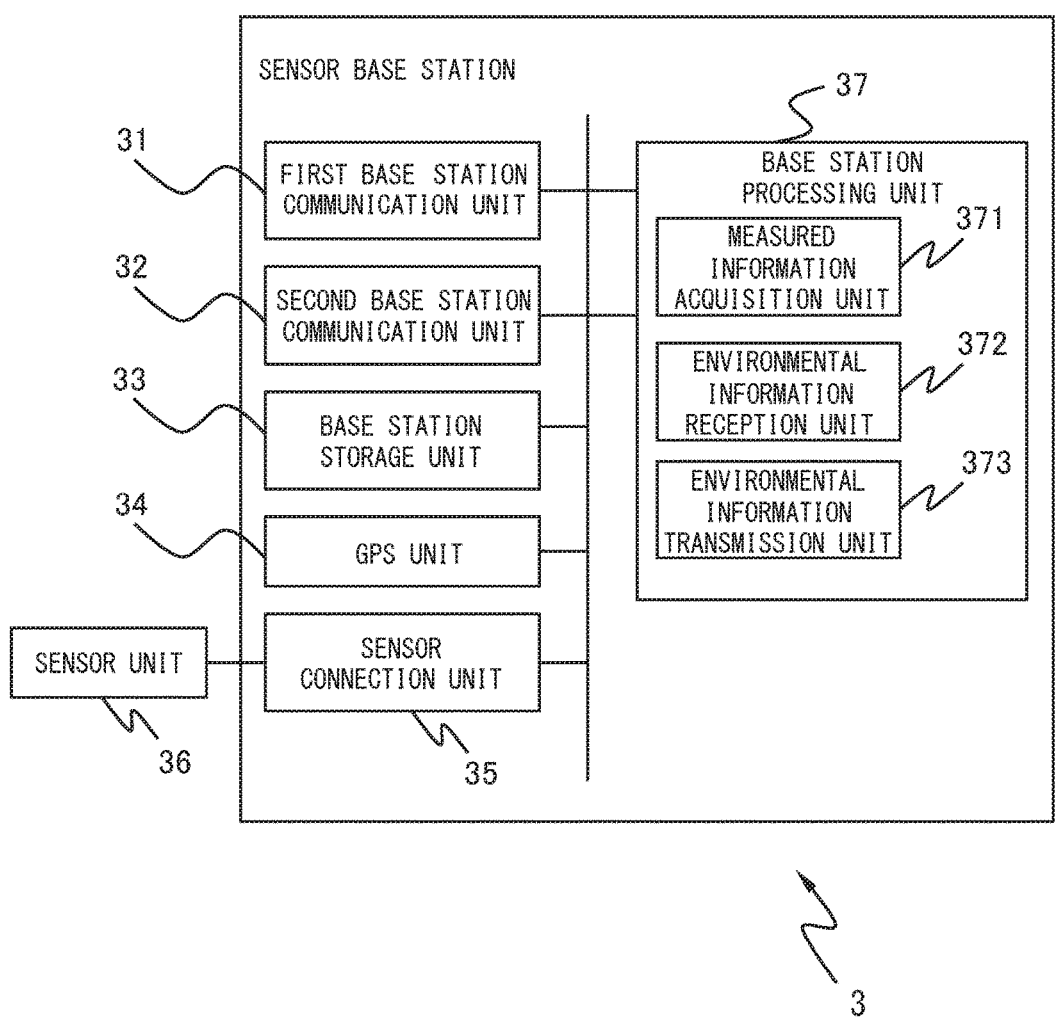
FIG. 4 is a block diagram illustrating an exemplary schematic configuration of a sensor base station 3.

FIG. 4 is a block diagram illustrating an exemplary schematic configuration of the sensor base station 3.

The sensor base station 3 receives environmental information from the sensor terminal 2, acquires environmental information representing measured environmental factors, transmits the environmental information, and the like. Therefore, the sensor base station 3 includes a first base station communication unit 31, a second base station communication unit 32, a base station storage unit 33, a GPS unit 34, a sensor connection unit 35, a sensor unit 36, and a base station processing unit 37.

The first base station communication unit 31 includes a communication interface circuit, including an antenna mainly having a 920-MHz sensitive band, and connects the sensor base station 3 to the sensor network 7. The first base station communication unit 31 uses a specific channel to wirelessly communicate with the sensor terminal 2 based on, e.g., the specified low-power wireless scheme. The frequency band of the first base station communication unit 31 is not limited to the above-mentioned one. The first base station communication unit 31 receives environmental information transmitted from the sensor terminal 2 and supplies the received environmental information to the base station processing unit 37.

The second base station communication unit 32 includes a communication interface circuit, including an antenna mainly having a 2.4- or 5-GHz sensitive band or the like, and wirelessly communicates with the base station 6 of a wireless LAN (Local Area Network) (not illustrated) based on the IEEE (The Institute of Electrical and Electronics Engineers, Inc.) 802.11 standard wireless communication scheme. The frequency band of the second base station communication unit 32 is not limited to the above-mentioned one. The second base station communication unit 32 transmits environmental information supplied from the base station processing unit 37 to the base station 6.

The base station storage unit 33 includes, e.g., a semiconductor memory. The base station storage unit 33 stores, e.g., driver programs, operating system programs, and data used in processing by the base station processing unit 37. For example, the base station storage unit 33 stores, as the driver programs, a wireless communication device driver program for controlling the first base station communication unit 31, a wireless LAN communication device driver program for controlling the second base station communication unit 32, a GPS driver program for controlling the GPS unit 34, a sensor driver program for controlling the sensor unit 25, and the like. The base station storage unit 33 further stores, as the operating system programs, a wireless control program for executing, e.g., the specified low-power wireless scheme, a connection control program for executing the IEEE 802.11 standard wireless communication scheme, and the like. The base station storage unit 33 further stores, as the data, environmental information representing environmental factors measured by the sensor unit 36, and environmental information received from the sensor terminal 2.

The GPS unit 34 includes a GPS circuit, including an antenna mainly having a 1.5-GHz sensitive band, and receives a GPS signal from a GPS satellite (not illustrated). The GPS unit 34 decodes the GPS signal to acquire time instant information and the like. The GPS unit 34 calculates the pseudo-distance from the GPS satellite to the sensor base station 3 based on the time instant information and the like and solves simultaneous equations obtained by substituting this pseudo-distance to detect the position (e.g., the latitude, the longitude, and the altitude) of the sensor base station 3. The GPS unit 34 associates positional information representing the detected position and the acquired time instant information with each other and periodically outputs them to the base station processing unit 37.

The sensor connection unit 35 includes a sensor terminal to be connected to the sensor unit 36 and is connected to the sensor unit 36 for measuring one or more types of environmental factors.

The sensor unit 36 includes various sensors for measuring environmental factors such as the ambient temperature, the relative humidity, the soil temperature, the soil moisture content, the amount of solar radiation, the soil electrical conductivity, the soil pH level, the wind direction and speed, the saturation deficit, the dew-point temperature, the water level, the water temperature, and $CO_2$. The sensor unit 36 includes at least one of, e.g., an ambient temperature sensor for measuring the ambient temperature, a relative humidity sensor for measuring the humidity, a soil temperature sensor for measuring the soil temperature, a soil moisture sensor for measuring the soil moisture content, a solar radiation sensor for measuring the amount of solar radiation, a soil EC (Electrical Conductivity) sensor for measuring the soil electrical conductivity, a soil pH sensor for measuring the soil pH level, wind direction and speed sensors, a dew-point temperature sensor, a water level sensor, a water temperature sensor, and a $CO_2$ sensor.

The base station processing unit 37 includes one or more processors and their peripheral circuits. The base station processing unit 37 performs centralized control over the operation of the entire sensor base station 3 and serves as, e.g., a CPU (Central Processing Unit). The base station processing unit 37 controls the operations of, e.g., the first base station communication unit 31, the second base station communication unit 32, the GPS unit 34, and the sensor unit 36 to perform various processes of the sensor base station 3 in an appropriate order in accordance with, e.g., the programs stored in the base station storage unit 33. The base station processing unit 37 performs processing based on the programs (e.g., driver programs and operating system programs) stored in the base station storage unit 33.

The base station processing unit 37 includes a measured information acquisition unit 371, an environmental information reception unit 372, and an environmental information transmission unit 373. Each of these units of the base station processing unit 37 serves as a functional module implemented by a program executed on the processor of the base station processing unit 37. Alternatively, each of these units of the base station processing unit 37 may be implemented in the sensor base station 3 as an independent integrated circuit, microprocessor, or firmware.

Figure 5:
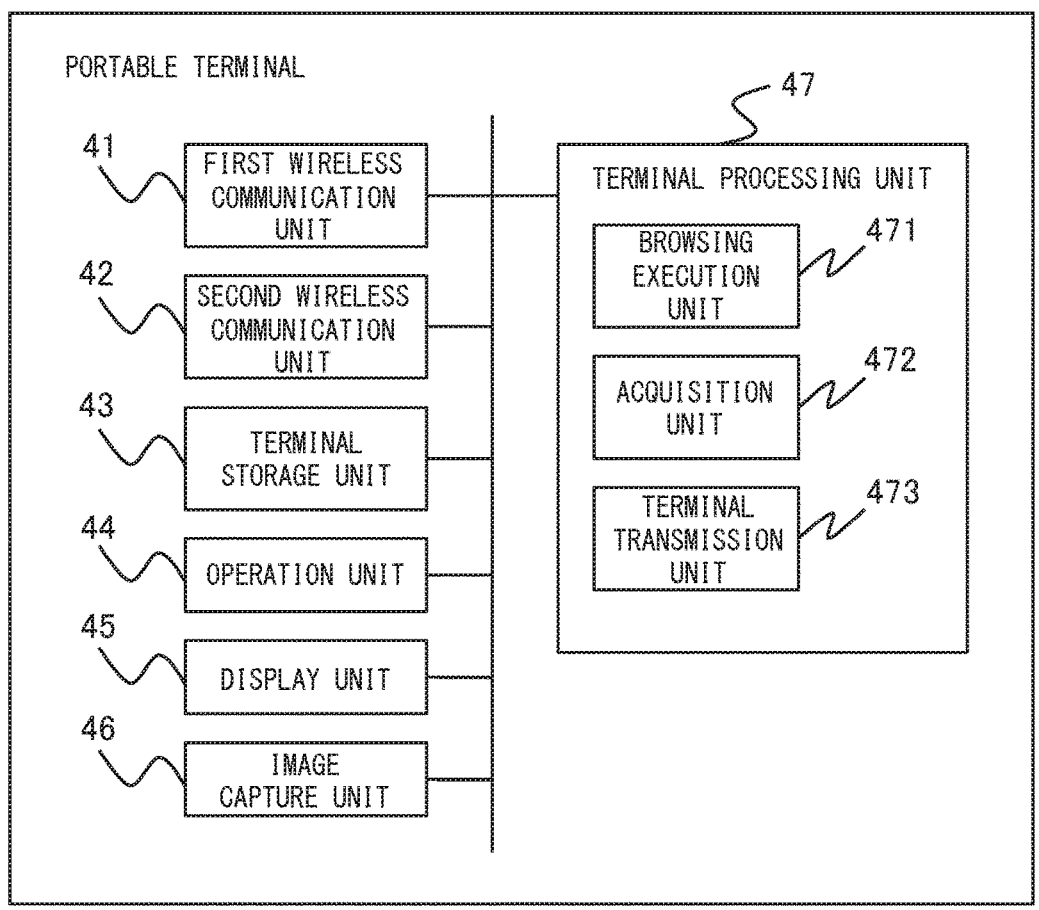
FIG. 5 is a block diagram illustrating an exemplary schematic configuration of a portable terminal 4.

FIG. 5 is a block diagram illustrating an exemplary schematic configuration of the portable terminal 4.

The portable terminal 4 transmits user information, receives the history and range information of environmental information in an agricultural field, displays the history and range information of the environmental information, and the like. Therefore, the portable terminal 4 includes a first wireless communication unit 41, a second wireless communication unit 42, a terminal storage unit 43, an operation unit 44, a display unit 45, an image capture unit 46, and a terminal processing unit 47.

The first wireless communication unit 41 includes a communication interface circuit, including an antenna mainly having a 2.1-GHz sensitive band, and connects the portable terminal 4 to a communication network (not illustrated). The first wireless communication unit 41 establishes a wireless signal channel based on, e.g., CDMA (Code Division Multiple Access) with the base station 6 via a channel assigned by the base station 6 to communicate with the base station 6. The scheme of communication with the base station 6 is not limited to CDMA, and other communication schemes such as W-CDMA (Wideband Code Division Multiple Access) or LTE (Long Term Evolution) may also be employed, or communication schemes to be used in the future may even be employed. The scheme of communication with the base station 6 may even be other communication schemes such as PHS (Personal Handy-phone System). The frequency band of the first wireless communication unit 41 is not limited to the above-mentioned one. The first wireless communication unit 41 supplies data received from the base station 6 to the terminal processing unit 47 and transmits data supplied from the terminal processing unit 47 to the base station 6.

The second wireless communication unit 42 includes a communication interface circuit, including an antenna mainly having a 2.4- or 5-GHz sensitive band or the like, and wirelessly communicates with an access point of a wireless LAN (Local Area Network) (not illustrated) based on the IEEE (The Institute of Electrical and Electronics Engineers, Inc.) 802.11 standard wireless communication scheme. The frequency band of the second wireless communication unit 42 is not limited to the above-mentioned one. The second wireless communication unit 42 supplies data received from the base station 6 to the terminal processing unit 47 and transmits data supplied from the terminal processing unit 47 to the base station 6.

The terminal storage unit 43 includes, e.g., a semiconductor memory. The terminal storage unit 43 stores, e.g., driver programs, operating system programs, application programs, and data used in processing by the terminal processing unit 47. For example, the terminal storage unit 43 stores, as the driver programs, a mobile phone communication device driver program for controlling the first wireless communication unit 41, a wireless LAN communication device driver program for controlling the second wireless communication unit 42, an input device driver program for controlling the operation unit 44, an output device driver program for controlling the display unit 45, and the like. The terminal storage unit 43 further stores, as the operating system programs, a connection control program for executing the IEEE 802.11 standard wireless communication scheme, a mobile phone connection control program, and the like. The terminal storage unit 43 further stores, as the application programs, a Web browser program for retrieving and displaying a Web page, an email program for sending and receiving email, and the like. Computer programs may also be installed on the terminal storage unit 43 using, e.g., a known setup program from a computer-readable portable recording medium such as a CD-ROM (Compact Disk Read Only Memory) or a DVD-ROM (Digital Versatile Disk Read Only Memory).

The operation unit 44 may be implemented as any device as long as it allows the operation of the portable terminal 4, and a touch panel input device or a keypad, for example, may be used. The owner can input characters, figures, and the like using this device. The operation unit 44, upon being operated by the owner, generates a signal corresponding to the operation. The generated signal is input to the terminal processing unit 47 as an owner's instruction.

The display unit 45 may be implemented as any device as long as it can output video and still images, and the like, and a touch panel display, a liquid crystal display, or an organic EL (Electro-Luminescence) display, for example, may be used. The display unit 45 displays a video image according to video image data, a still image according to still image data, and the like supplied from the terminal processing unit 47.

The image capture unit 46 includes, e.g., an imaging optical system, an image sensor, and an image processing unit. The imaging optical system is implemented as, e.g., an optical lens and forms an image of a light beam from an object on the image sensing plane of the image sensor. The image sensor is implemented as, e.g., a CCD (Charge Coupled Device) or a CMOS (Complementary Metal Oxide Semiconductor) and outputs an image signal of the object image formed on the image sensing plane. The image processing unit creates and outputs image data in a predetermined file format from the image signal generated by the image sensor.

The terminal processing unit 47 includes one or more processors and their peripheral circuits. The terminal processing unit 47 performs centralized control over the operation of the entire portable terminal 4 and serves as, e.g., a CPU (Central Processing Unit). The terminal processing unit 47 controls the operations of, e.g., the first wireless communication unit 41, the second wireless communication unit 42, and the display unit 45 to perform various processes of the portable terminal 4 in an appropriate order in accordance with, e.g., the programs stored in the terminal storage unit 43 and output from the operation of the operation unit 44. The terminal processing unit 47 performs processing based on the programs (e.g., driver programs, operating system programs, and application programs) stored in the terminal storage unit 43. The terminal processing unit 47 can also execute a set of programs (e.g., application programs) in parallel.

The terminal processing unit 47 includes a browsing execution unit 471, an acquisition unit 472, and a terminal transmission unit 473. Each of these units of the terminal processing unit 47 serves as a functional module implemented by a program executed on the processor of the terminal processing unit 47. Alternatively, each of these units of the terminal processing unit 47 may be implemented in the portable terminal 4 as an independent integrated circuit, microprocessor, or firmware.

Figure 6:
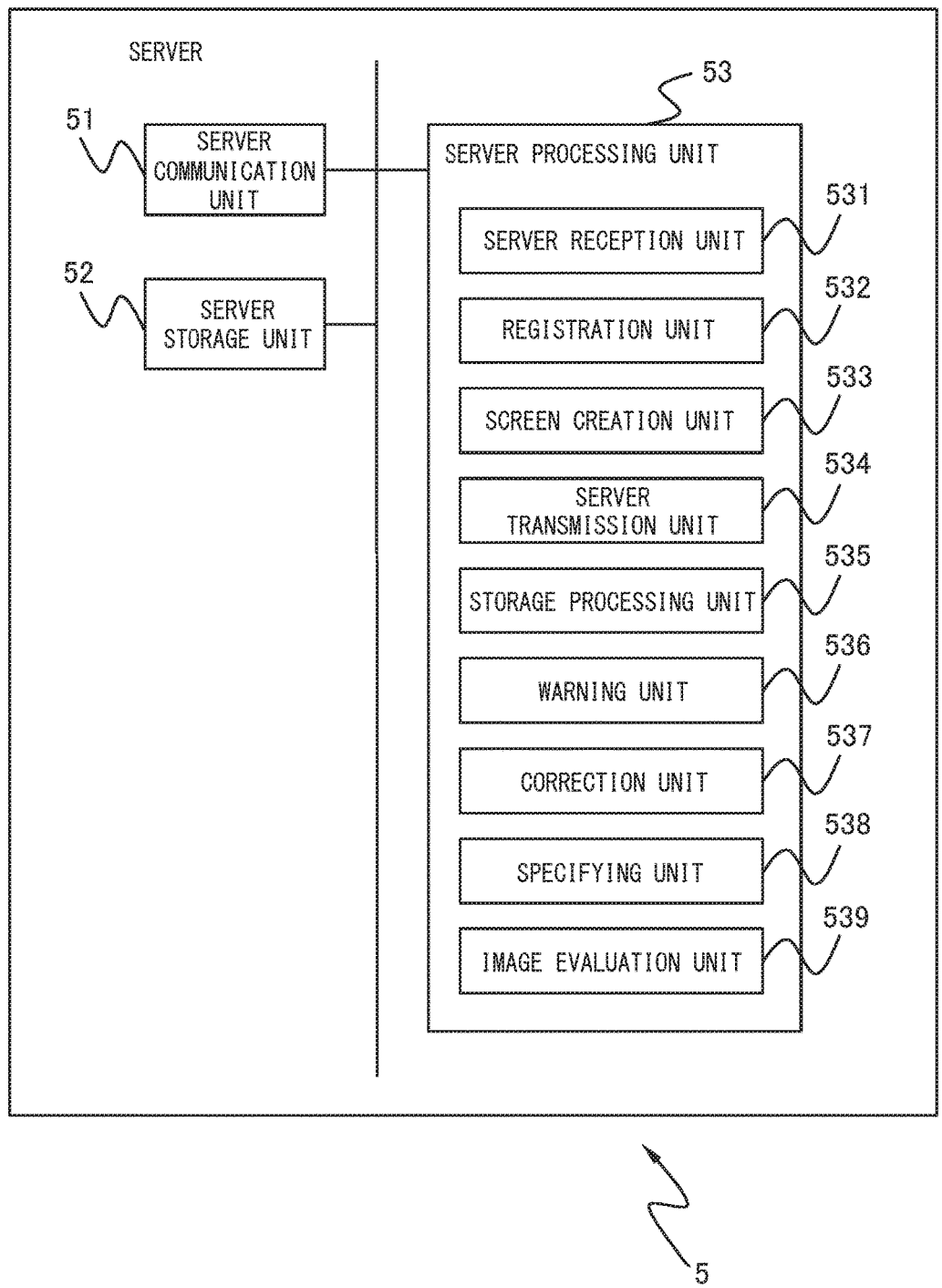
FIG. 6 is a block diagram illustrating an exemplary schematic configuration of a server 5.

FIG. 6 is a block diagram illustrating an exemplary schematic configuration of the server 5. FIGS. 7A to 7D are tables illustrating exemplary data structures of various tables stored in a server storage unit 52.

The server 5, upon receiving environmental information from the sensor terminal 2 or the sensor base station 3, accumulates and manages the environmental information and transmits, e.g., the environmental information and the range information of the environmental information to the portable terminal 4. Further, the server 5, upon receiving a captured image of disease or insect damage transmitted from the portable terminal 4, searches for the name of disease or insect damage corresponding to the captured image and transmits the found name of disease or insect damage to the portable terminal 4 as an evaluation result name. Therefore, the server 5 includes a server communication unit 51, a server storage unit 52, and a server processing unit 53.

The server communication unit 51 includes a communication interface circuit for connecting the server 5 to the Internet 11. The server communication unit 51 receives data transmitted from the sensor terminal 2 or the sensor base station 3 and data transmitted from the portable terminal 4 and supplies these received data to the server processing unit 53.

The server storage unit 52 includes at least one of, e.g., a semiconductor memory, a magnetic disk device, and an optical disk device. The server storage unit 52 stores, e.g., driver programs, operating system programs, application programs, and data used in processing by the server processing unit 53. For example, the server storage unit 52 stores, as the driver programs, a communication device driver program for controlling the server communication unit 51, and the like. Computer programs may also be installed on the server storage unit 52 using, e.g., a known setup program from a computer-readable portable recording medium such as a CD-ROM or a DVD-ROM.

The server storage unit 52 further stores, as the data, a user management table illustrated in FIG. 7A, a sensor management table illustrated in FIG. 7B, a range management table illustrated in FIG. 7C, an evaluation history table illustrated in FIG. 7D, various image data associated with screen display, and the like. The server storage unit 52 may further temporarily store temporary data associated with predetermined processing.

FIG. 7A illustrates a user management table for managing users. The user management table stores, for each user, pieces of information such as the identification number of this user (user ID), the name of this user, the email address of this user, and the identification number of the sensor terminal 2 and the sensor base station 3 (sensor ID) in association with each other. The sensor terminal ID means the identification number of the sensor terminal 2 owned by the user.

FIG. 7B illustrates a sensor management table for managing the sensor terminals 2 and the sensor base station 3. The sensor management table stores, for each sensor terminal 2 and the sensor base station 3, pieces of information such as the identification number of this sensor terminal 2 and the sensor base station 3 (sensor ID), the sensor position, the identification number of an agricultural field (agricultural field ID), the identification number of a crop (crop ID), the current growth stage, the lower limit evaluation value, and pieces of record-specific environmental information in association with each other.

The sensor position is defined by the latitude and longitude acquired by the GPS units of each sensor terminal 2 and the sensor base station 3, transmitted from this sensor terminal 2 and the sensor base station 3. The agricultural field ID means the identification number of an agricultural field in which each sensor terminal 2 and the sensor base station 3 are located. The crop ID means the identification number of a crop cultivated in an agricultural field in which each sensor terminal 2 and the sensor base station 3 are located. The growth stage is defined by growth condition-specific divisions of the growth duration in which each crop is bred, and a plurality of growth stages are set for each type of crop. Examples of the growth stage may include the sowing, seedling cultivation, and rooting stages.

The current growth stage is of a crop bred in an agricultural field in which each sensor terminal 2 and the sensor base station 3 are located. The current growth stage is updated to the next growth stage when the server 5 receives a growth stage update request transmitted from the user. The lower limit evaluation value means the lower limit of the outcome value desired by the user among the outcome values of a crop bred in an agricultural field in which each sensor terminal 2 and the sensor base station 3 are located. The lower limit evaluation value is set by the user, but it may also be set to a certain evaluation value. The pieces of record-specific environmental information are stored as sequentially associated in accordance with the measurement time for each sensor ID, based on the sensor ID, the environmental information, and the measurement time transmitted from the sensor base station 3 in a predetermined server transmission cycle. For example, for each sensor ID, environmental information at the first measurement time is stored as one record, and each record is stored as record 1, record 2, record 3, . . . in the order of measurement. The environmental information includes the ambient temperature, the relative humidity, the soil temperature, the soil moisture content, the amount of solar radiation, the soil electrical conductivity, the soil pH level, the wind direction and speed, the saturation deficit, the dew-point temperature, the water level, the water temperature, and/or $CO_2$, but it may also include other environmental factors, or it may even include the accumulated value of each environmental factor. As the growth stage included in each record, the current growth stage at the moment of storage of environmental information is stored.

FIG. 7C illustrates a range management table for managing the range information of environmental information. The range management table stores, for each crop, the identification number of this crop (crop ID), the range information of environmental information involved to harvest a crop for each growth stage, and the like in association with each other.

FIG. 7D illustrates an evaluation history table for managing the evaluation value of a crop bred in the past. The evaluation history table stores, for each sensor terminal 2 and sensor base station 3, the identification number of this sensor terminal 2 and sensor base station 3 (sensor ID), the evaluation history of a crop harvested in an agricultural field in which this sensor terminal 2 and sensor base station 3 are located, and the like in association with each other. The evaluation history includes, e.g., the growth duration of a crop harvested in the past, and an evaluation value representing the outcome value of the crop. A storage processing unit 535 may also store the evaluation history stored in the evaluation history table and the agricultural field ID and/or the crop ID stored in the sensor management table, in the server storage unit 52 in association with each other.

Referring back to FIG. 6, the server processing unit 53 includes one or more processors and their peripheral circuits. The server processing unit 53 performs centralized control over the operation of the entire server 5 and serves as, e.g., a CPU. The server processing unit 53 controls the operation of, e.g., the server communication unit 51 to perform various processes of the server 5 in an appropriate order in accordance with, e.g., the programs stored in the server storage unit 52. The server processing unit 53 performs processing based on the programs (e.g., driver programs, operating system programs, and application programs) stored in the server storage unit 52. The server processing unit 53 can also execute a set of programs (e.g., application programs) in parallel.

The server processing unit 53 includes a server reception unit 531, a registration unit 532, a screen creation unit 533, a server transmission unit 534, a storage processing unit 535, a warning unit 536, a correction unit 537, a specifying unit 538, and an image evaluation unit 539. Each of these units of the server processing unit 53 serves as a functional module implemented by a program executed on the processor of the server processing unit 53. Alternatively, each of these units of the server processing unit 53 may be implemented in the server 5 as an independent integrated circuit, microprocessor, or firmware.

Figure 8:
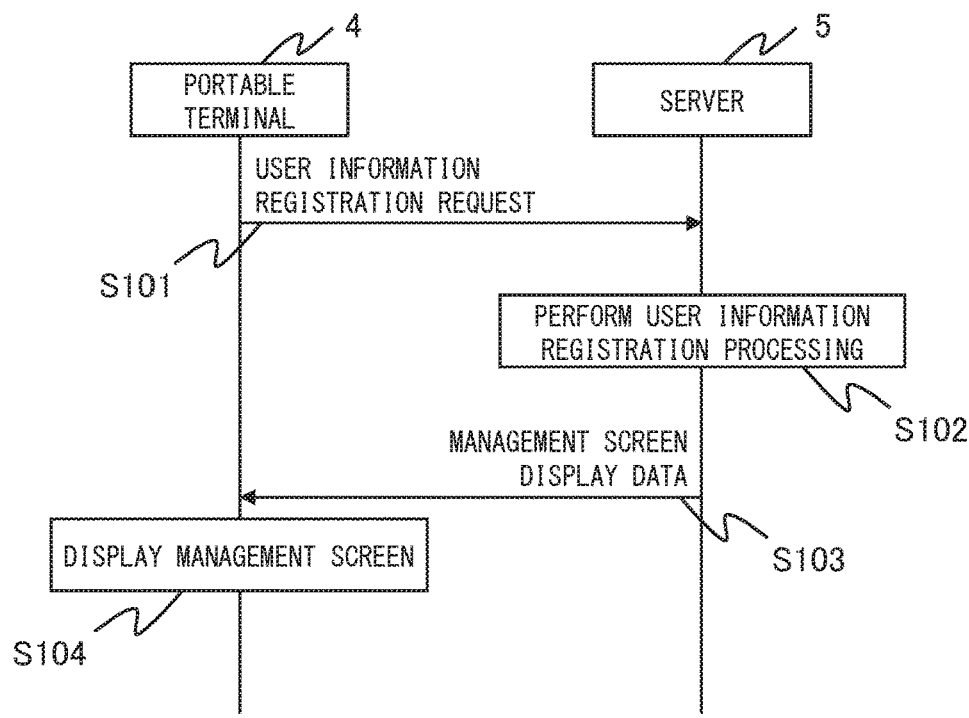
FIG. 8 is a chart illustrating an exemplary operation sequence associated with the agricultural management system 1.

FIG. 8 is a chart illustrating an exemplary operation sequence associated with the agricultural management system 1. The operation sequence illustrated in FIG. 8 exemplifies user information registration processing shared between the portable terminal 4 and the server 5.

The following operation sequence is executed mainly by the terminal processing unit 47 and the server processing unit 53 in cooperation with the elements of the portable terminal 4 and the server 5, based on the programs stored in the terminal storage unit 43 and the server storage unit 52 in advance.

First, the browsing execution unit 471 of the portable terminal 4 transmits user information input using the operation unit 44 by the user to the server 5 via the second wireless communication unit 42, together with a user information registration request (step S101). The server reception unit 531 of the server 5 receives via the server communication unit 51, the user information transmitted from the portable terminal 4. The user information includes, e.g., the name of the user, the email address of the user, the sensor ID of the sensor terminal 2 owned by the user and the sensor base station, an agricultural field ID corresponding to this sensor ID, the crop ID, the current growth stage, the lower limit evaluation value, and the range information of environmental information involved to harvest a crop for each growth stage. As the agricultural field ID, a unique ID may be assigned by the server 5 based on the name of an agricultural field input using the operation unit 44 by the user. As the crop ID, a unique ID may be assigned by the server 5 based on the type of crop input using the operation unit 44 by the user.

The registration unit 532 performs user information registration processing for registering the user information received by the server reception unit 531 in various tables recorded in the server storage unit 52 (step S102).

The screen creation unit 533 creates management screen display data including the user information registered by the registration unit 532. When management screen display data is created by the screen creation unit 533, the server transmission unit 534 transmits the created management screen display data to the portable terminal 4 via the server communication unit 51 (step S103). The browsing execution unit 471 of the portable terminal 4 displays a management screen (not illustrated) including the registered user information, based on the management screen display data received via the second wireless communication unit 42 (step S104).

Figure 9:
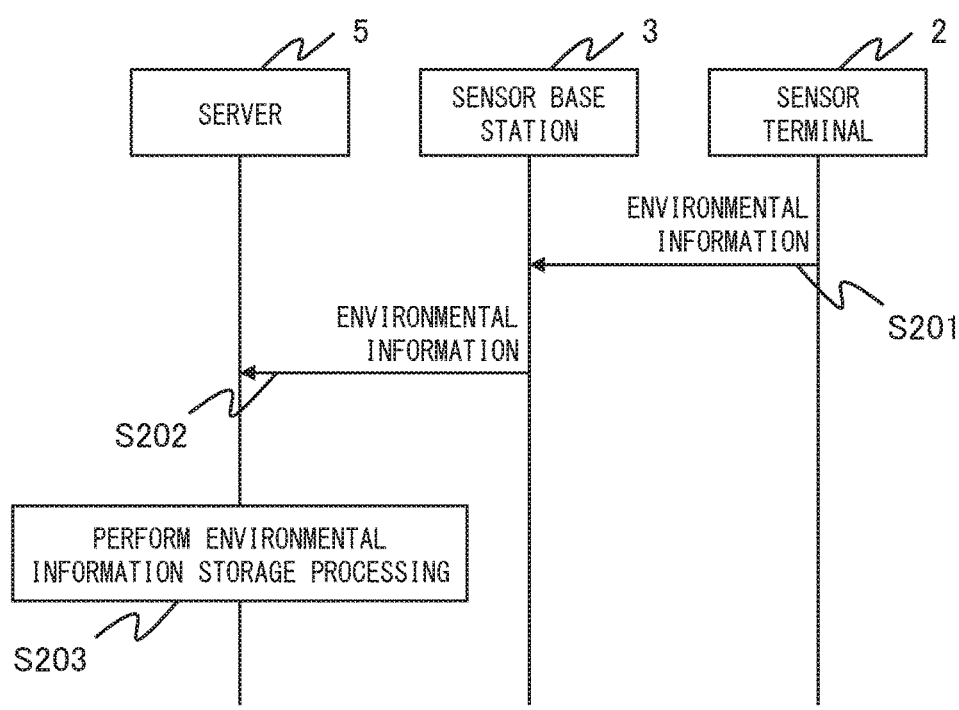
FIG. 9 is a chart illustrating another exemplary operation sequence associated with the agricultural management system 1.

FIG. 9 is a chart illustrating another exemplary operation sequence associated with the agricultural management system 1. The operation sequence illustrated in FIG. 9 exemplifies environmental information storage processing shared among the sensor terminal 2, the sensor base station 3, and the server 5.

The following operation sequence is executed mainly by the sensor terminal processing unit 26, the base station processing unit 37, and the server processing unit 53 in cooperation with the elements of the sensor terminal 2, the sensor base station 3, and the server 5, based on the programs stored in the sensor terminal storage unit 22, the base station storage unit 33, and the server storage unit 52 in advance.

First, the measured information acquisition unit 261 of the sensor terminal 2 acquires environmental information representing environmental factors measured by the sensor unit 25 from the sensor unit 25 via the sensor connection unit 24 in a predetermined measurement cycle and also acquires time instant information periodically output from the GPS unit 23. The measured information acquisition unit 261 stores the environmental information acquired from the sensor unit 25 and the time instant information acquired from the GPS unit 23 in the sensor terminal storage unit 22 in association with a sensor ID for identifying the sensor terminal 2. The measured information transmission unit 262 transmits the sensor ID, the environmental information, and the measurement time stored in the sensor terminal storage unit 22 to the sensor base station 3 via the sensor terminal communication unit 21 in a predetermined transmission cycle (step S201).

The measured information acquisition unit 371 of the sensor base station 3 acquires environmental information representing environmental factors measured by the sensor unit 36 from the sensor unit 36 via the sensor connection unit 35 in a predetermined measurement cycle and also acquires time instant information periodically output from the GPS unit 34. The measured information acquisition unit 371 stores the environmental information acquired from the sensor unit 36 and the time instant information acquired from the GPS unit 34 in the base station storage unit 33 in association with a sensor ID for identifying the sensor base station 3. The environmental information reception unit 372 receives via the first base station communication unit 31, the sensor ID, the environmental information, and the measurement time transmitted from the sensor terminal 2 in a predetermined transmission cycle. The environmental information reception unit 372 stores the received sensor ID, the environmental information, and the measurement time in the base station storage unit 33. The environmental information transmission unit 373 transmits the sensor ID, the environmental information, and the measurement time stored in the base station storage unit 33 to the server 5 via the second base station communication unit 32 in a predetermined server transmission cycle (step S202).

The server reception unit 531 of the server 5 receives via the server communication unit 51, the sensor ID, the environmental information, and the measurement time transmitted from the sensor base station 3 in a predetermined server transmission cycle. The storage processing unit 535 sequentially stores the received measurement time and environmental information in the sensor management table of the server storage unit 52 for each record in association with the sensor ID received at the same time (step S203).

FIG. 10 is a chart illustrating still another exemplary operation sequence associated with the agricultural management system 1. The operation sequence illustrated in FIG. 10 exemplifies range information registration processing shared between the portable terminal 4 and the server 5.

The following operation sequence is executed mainly by the terminal processing unit 47 and the server processing unit 53 in cooperation with the elements of the portable terminal 4 and the server 5, based on the programs stored in the terminal storage unit 43 and the server storage unit 52 in advance.

First, the browsing execution unit 471 of the portable terminal 4 transmits a crop ID for identifying a crop input using the operation unit 44 by the user and the range information of environmental information involved to harvest a crop having each evaluation value to the server 5 via the second wireless communication unit 42, together with a request to register the range information of the environmental information (step S301). The range information of environmental information involved to harvest a crop having each evaluation value will sometimes be referred to as the range information of environmental information corresponding to each evaluation value hereinafter.

The server reception unit 531 of the server 5 receives via the server communication unit 51, the crop ID and the range information of environmental information corresponding to each evaluation value transmitted from the portable terminal 4. The registration unit 532 associates the crop ID with the range information of environmental information corresponding to each evaluation value and records them in the range management table of the server storage unit 52 (step S302).

The screen creation unit 533 creates management screen display data including a crop indicated by the crop ID and the range information of environmental information corresponding to both the crop and each evaluation value, recorded in the range management table of the registration unit 532. When management screen display data is created by the screen creation unit 533, the server transmission unit 534 transmits the created management screen display data to the portable terminal 4 via the server communication unit 51 (step S303).

The browsing execution unit 471 of the portable terminal 4 displays a management screen (not illustrated) including the registered range information of the environmental information, based on the management screen display data received via the second wireless communication unit 42 (step S304).

FIG. 11 is a chart illustrating still another exemplary operation sequence associated with the agricultural management system 1. The operation sequence illustrated in FIG. 11 exemplifies warning email output processing shared between the portable terminal 4 and the server 5.

The following operation sequence is executed mainly by the terminal processing unit 47 and the server processing unit 53 in cooperation with the elements of the portable terminal 4 and the server 5, based on the programs stored in the terminal storage unit 43 and the server storage unit 52 in advance.

First, the warning unit 536 and the screen creation unit 533 of the server 5 perform warning email output processing in a predetermined warning cycle (step S401). The warning email output processing will be described in detail later. When warning email output processing is performed by the warning unit 536 and the screen creation unit 533, the server transmission unit 534 receives warning email from the warning unit 536 and transmits the warning email to the portable terminal 4 indicated by the transmission destination address included in the warning email (step S402).

Figure 12:
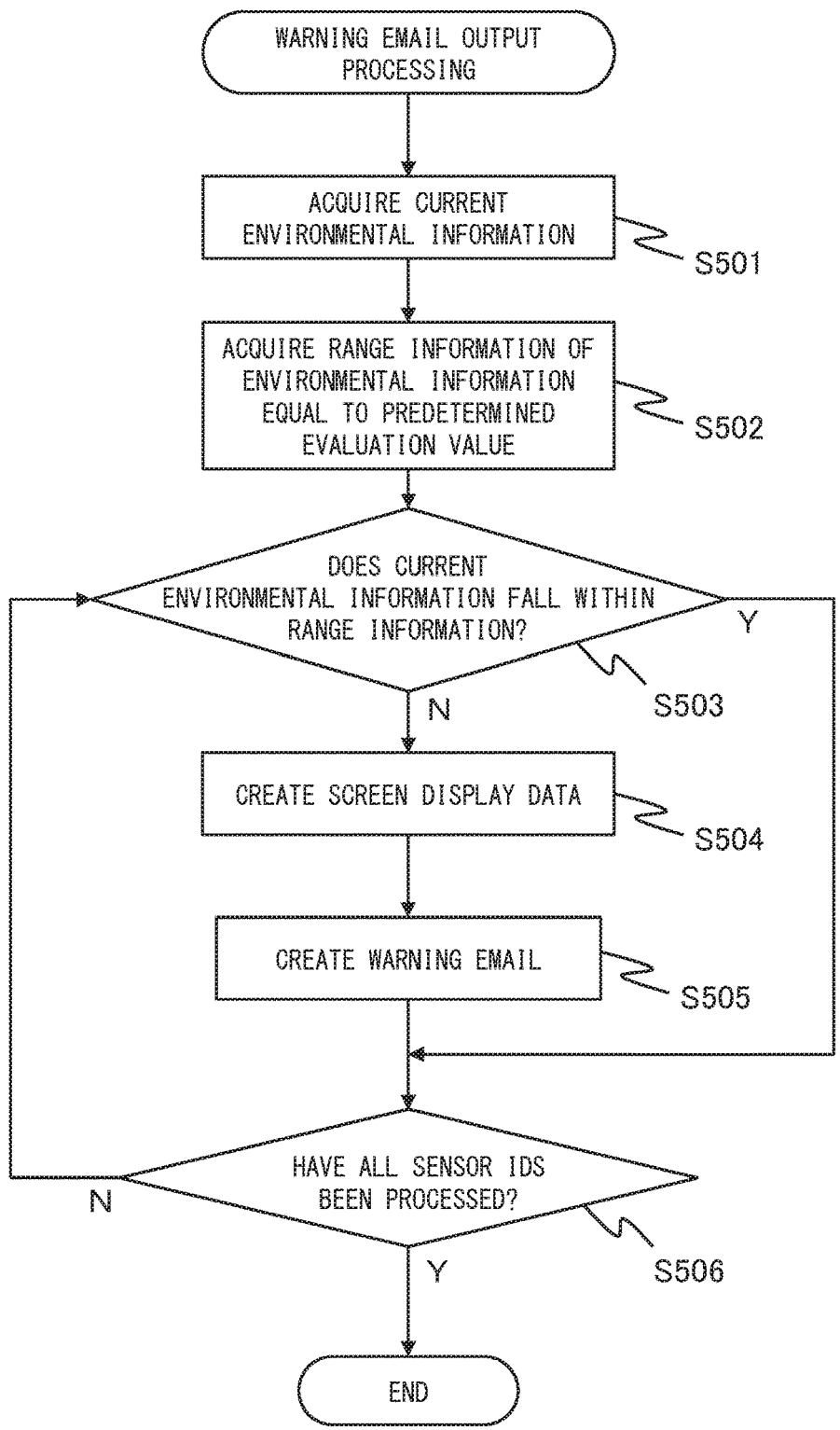
FIG. 12 is a flowchart illustrating exemplary warning email output processing.

FIG. 12 is a flowchart illustrating an exemplary operation sequence of warning email output processing by the warning unit 536 and the screen creation unit 533. The warning email output processing illustrated in FIG. 12 is performed in step S401 of FIG. 11.

First, the warning unit 536 looks up the sensor management table stored in the server storage unit 52 to acquire environmental information of the latest record in a predetermined warning cycle for each sensor ID (step S501). The warning unit 536 further looks up the sensor management table stored in the server storage unit 52 to extract a crop ID and a lower limit evaluation value associated with each sensor ID, for each sensor ID. The warning unit 536 then looks up the range management table stored in the server storage unit 52 to acquire the range information of environmental information equal to or greater than the lower limit evaluation value (e.g., predetermined values of 4 and 5 when the lower limit evaluation value is 4) in the current growth stage, associated with the extracted crop ID (step S502). The lower limit evaluation value exemplifies a predetermined evaluation value.

The warning unit 536 determines, for each sensor ID, whether the environmental information of the latest record falls within the range information of environmental information equal to or greater than the lower limit evaluation value corresponding to the crop ID associated with each sensor ID (step S503). When the warning unit 536 determines that the environmental information of the latest record for each sensor ID falls within the range information of environmental information equal to the lower limit evaluation value corresponding to the crop ID associated with each sensor ID (Yes in step S503), it advances the process to step S506 (to be described later).

When the warning unit 536 determines that the environmental information of the latest record for each sensor ID falls outside the range information of environmental information equal to the lower limit evaluation value corresponding to the crop ID associated with each sensor ID (No in step S503), it creates environmental suitability information representing an environment involved to harvest a crop having the lower limit evaluation value. The environmental suitability information includes, e.g., information representing the difference between the environmental information of the latest record and the range information of environmental information equal to or greater than the lower limit evaluation value. The screen creation unit 533 creates management screen display data including the environmental suitability information created by the warning unit 536 (step S504).

The warning unit 536 creates warning email including information indicating that the current environmental information falls outside the range information of the environmental information (step S505). First, the warning unit 536 looks up the user management table to specify a user ID associated with a sensor ID corresponding to the environmental information of the latest record determined to fall outside the range information of environmental information equal to the lower limit evaluation value to acquire an email address associated with the specified user ID. The warning unit 536 further creates warning email having the acquired email address set as a transmission destination, and information indicating that the current environmental information falls outside the range information of the environmental information set as a text. The warning unit 536 passes the created warning email to the server transmission unit 534. The warning unit 536 may also include in the warning email, a URL (Uniform Resource Locator) indicating the storage location of management screen display data including the environmental suitability information. Thus, in response to the warning email, the user can display a management screen including the environmental suitability information on the portable terminal 4.

Upon creating warning email, the warning unit 536 determines whether the processes in steps S503 to S504 have been performed for all sensor IDs stored in the sensor management table (step S506). When the warning unit 536 determines that the processes in steps S503 to S504 have not been performed for all sensor IDs (No in step S506), it returns the process to step S503. When the warning unit 536 determines that the processes in steps S503 to S504 have been performed for all sensor IDs (Yes in step S506), it ends a series of steps.

Figure 13:
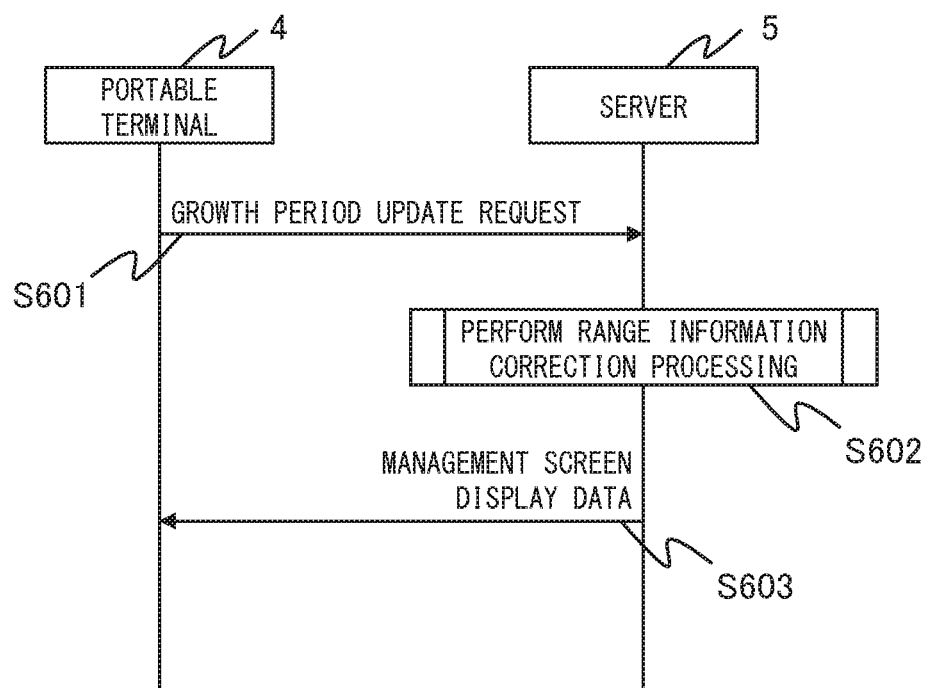
FIG. 13 is a chart illustrating still another exemplary operation sequence associated with the agricultural management system 1.

FIG. 13 is a chart illustrating still another exemplary operation sequence associated with the agricultural management system 1. The operation sequence illustrated in FIG. 13 exemplifies range information correction processing shared between the portable terminal 4 and the server 5.

The following operation sequence is executed mainly by the terminal processing unit 47 and the server processing unit 53 in cooperation with the elements of the portable terminal 4 and the server 5, based on the programs stored in the terminal storage unit 43 and the server storage unit 52 in advance.

First, when the user uses the operation unit 44 to input information indicating that any growth stage in the growth duration of each crop has ended, the browsing execution unit 471 of the portable terminal 4 transmits a growth stage update request including the sensor ID and the user ID of the user who owns the portable terminal 4 to the server 5 via the second wireless communication unit 42 (step S601). The ended growth stage will be referred to as the current growth stage hereinafter, and the growth stage to be updated by the growth stage update request will be referred to as the next growth stage hereinafter. The sensor ID is of the sensor terminal 2 and the sensor base station 3 located in an agricultural field in which a crop whose growth stage has ended is bred.

When the server reception unit 531 of the server 5 receives via the server communication unit 51, the growth stage update request transmitted from the portable terminal 4, the correction unit 537 and the screen creation unit 533 perform range information correction processing (step S602). The range information correction processing will be described in detail later.

When range information correction processing is performed by the correction unit 537 and the screen creation unit 533, the server transmission unit 534 receives management screen display data from the screen creation unit 533 and transmits the management screen display data to the portable terminal 4 (step S603).

Figure 14:
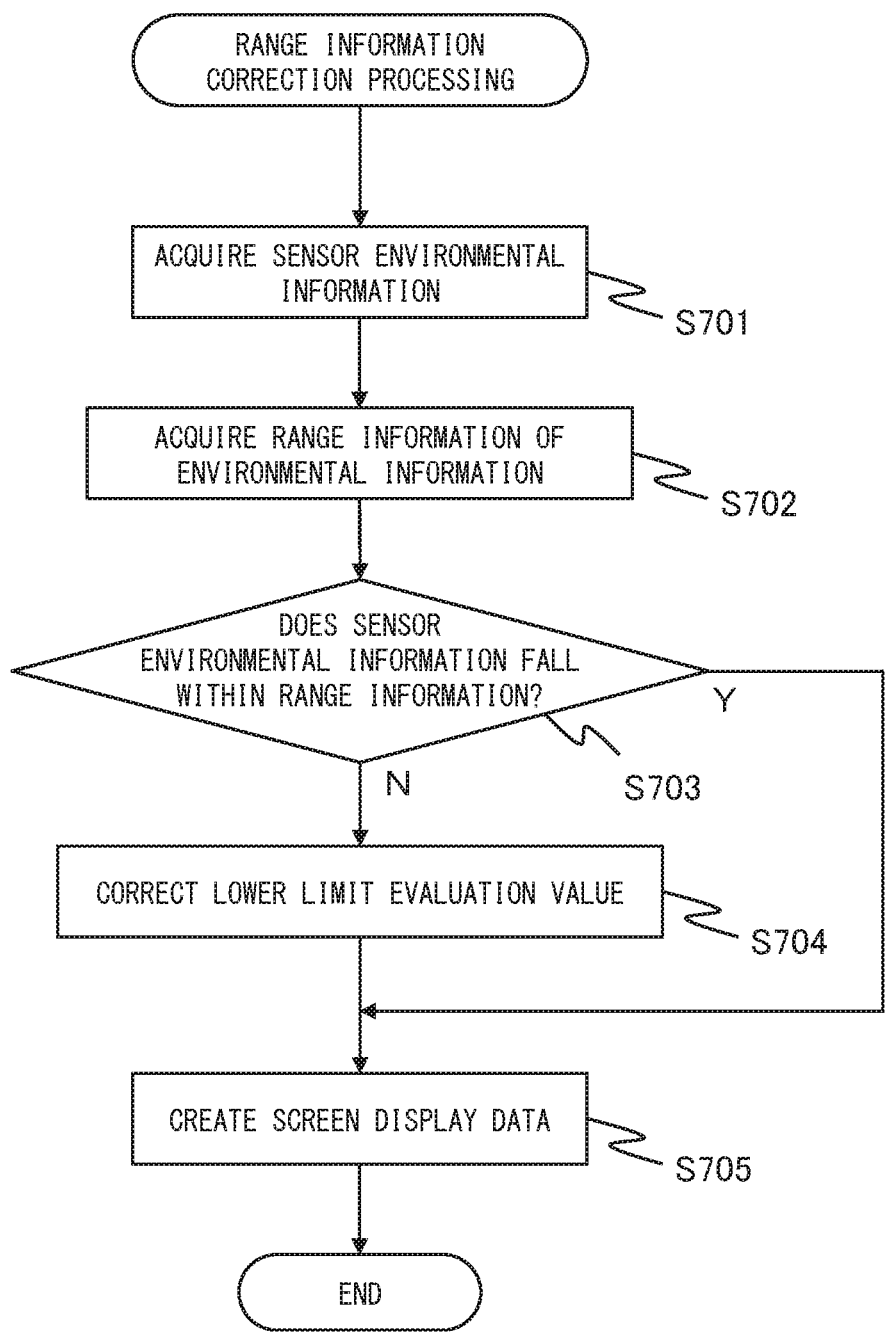
FIG. 14 is a flowchart illustrating exemplary range information correction processing.

FIG. 14 is a flowchart illustrating an exemplary operation sequence of range information correction processing by the correction unit 537 and the screen creation unit 533. The range information correction processing illustrated in FIG. 14 is performed in step S602 of FIG. 13.

First, the correction unit 537 looks up the sensor management table to acquire environmental information of records in the current growth stage among pieces of environmental information of respective records associated with the sensor ID included in the growth stage update request received by the server reception unit 531 (step S701). The correction unit 537 further looks up the sensor management table to extract a crop ID and a lower limit evaluation value associated with the sensor ID included in the growth stage update request and then looks up the range management table to acquire the range information of environmental information equal to or greater than the lower limit evaluation value in the current growth stage associated with the extracted crop ID (step S702). The range information of environmental information equal to or greater than the lower limit evaluation value in the current growth stage associated with the extracted crop ID will sometimes be referred to as target range information hereinafter.

The correction unit 537 determines whether the average of environmental information of records in the current growth stage falls within the target range information (step S703). The correction unit 537 may determine that the environmental information of records in the current growth stage falls within the target range information when the number of records of pieces of environmental information that fall within the target range information is equal to or larger than a predetermined number.

When the average of environmental information of records in the current growth stage falls within the target range information (Yes in step S703), the correction unit 537 advances the process to step S706. When the average of environmental information of records in the current growth stage falls outside the target range information (No in step S703), the correction unit 537 extracts an evaluation value lower than the lower limit evaluation value extracted in step S702 and stores the evaluation value extracted as a lower limit evaluation value associated with the sensor ID included in the growth stage update request in the sensor management table (step S704). The lower limit evaluation value and the evaluation value lower than the lower limit evaluation value exemplify a predetermined evaluation value and a second evaluation value. The second evaluation value is not limited to such an evaluation value lower than the lower limit evaluation value. For example, the correction unit 537 determines whether the average of environmental information of records in the current growth stage falls within the range information of environmental information equal to or greater than the lower limit evaluation value acquired in step S702. When the average of environmental information of records in the current growth stage falls within the range information of environmental information equal to or greater than the lower limit evaluation value, the correction unit 537 sets an evaluation value corresponding to the environmental information equal to or greater than the lower limit evaluation value as a second evaluation value. In this manner, a second evaluation value different from the predetermined evaluation value is extracted in accordance with the environmental information, and the evaluation value is stored in the sensor management table.

The correction unit 537 acquires the range information of environmental information equal to the second evaluation value in the next growth stage associated with the crop ID extracted in step S702, and the screen creation unit 533 creates management screen display data for displaying a management screen including the extracted range information of the environmental information (step S705). The screen creation unit 533 passes the created management screen display data to the server transmission unit 534 and ends a series of steps. The warning unit 536 performs the above-mentioned warning email output processing using an evaluation value lower than the lower limit evaluation value.

Figure 15:
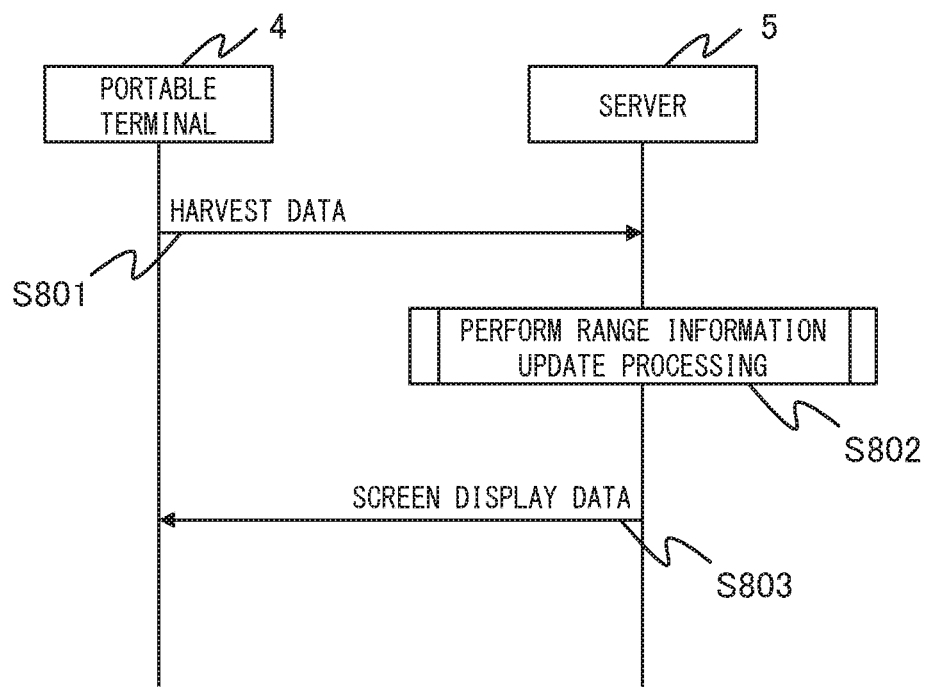
FIG. 15 is a chart illustrating still another exemplary operation sequence associated with the agricultural management system 1.

FIG. 15 is a chart illustrating still another exemplary operation sequence associated with the agricultural management system 1. The operation sequence illustrated in FIG. 15 exemplifies range information update processing shared between the portable terminal 4 and the server 5.

The following operation sequence is executed mainly by the terminal processing unit 47 and the server processing unit 53 in cooperation with the elements of the portable terminal 4 and the server 5, based on the programs stored in the terminal storage unit 43 and the server storage unit 52 in advance.

First, when the growth duration of each crop ends and this crop is harvested, the user uses the operation unit 44 to input the sensor ID of the sensor terminal 2 and the sensor base station 3 located in an agricultural field in which each harvested crop has been bred, and the crop ID, evaluation value, and growth duration of this harvested crop. The acquisition unit 472 of the portable terminal 4 acquires the input sensor ID and crop ID, evaluation value, and growth duration. The terminal transmission unit 473 transmits to the server 5 via the second wireless communication unit 42, the user ID of the user who owns the portable terminal 4, and harvest data including the sensor ID and the crop ID, evaluation value, and growth duration acquired by the acquisition unit 472 (step S801).

When the server reception unit 531 of the server 5 receives via the server communication unit 51, the harvest data transmitted from the portable terminal 4, the specifying unit 538 and the screen creation unit 533 perform range information update processing (step S802). The range information update processing will be described in detail later.

When the range information update processing is performed by the specifying unit 538 and the screen creation unit 533, the server transmission unit 534 receives management screen display data from the screen creation unit 533 and transmits the management screen display data to the portable terminal 4 (step S803).

Figure 16:
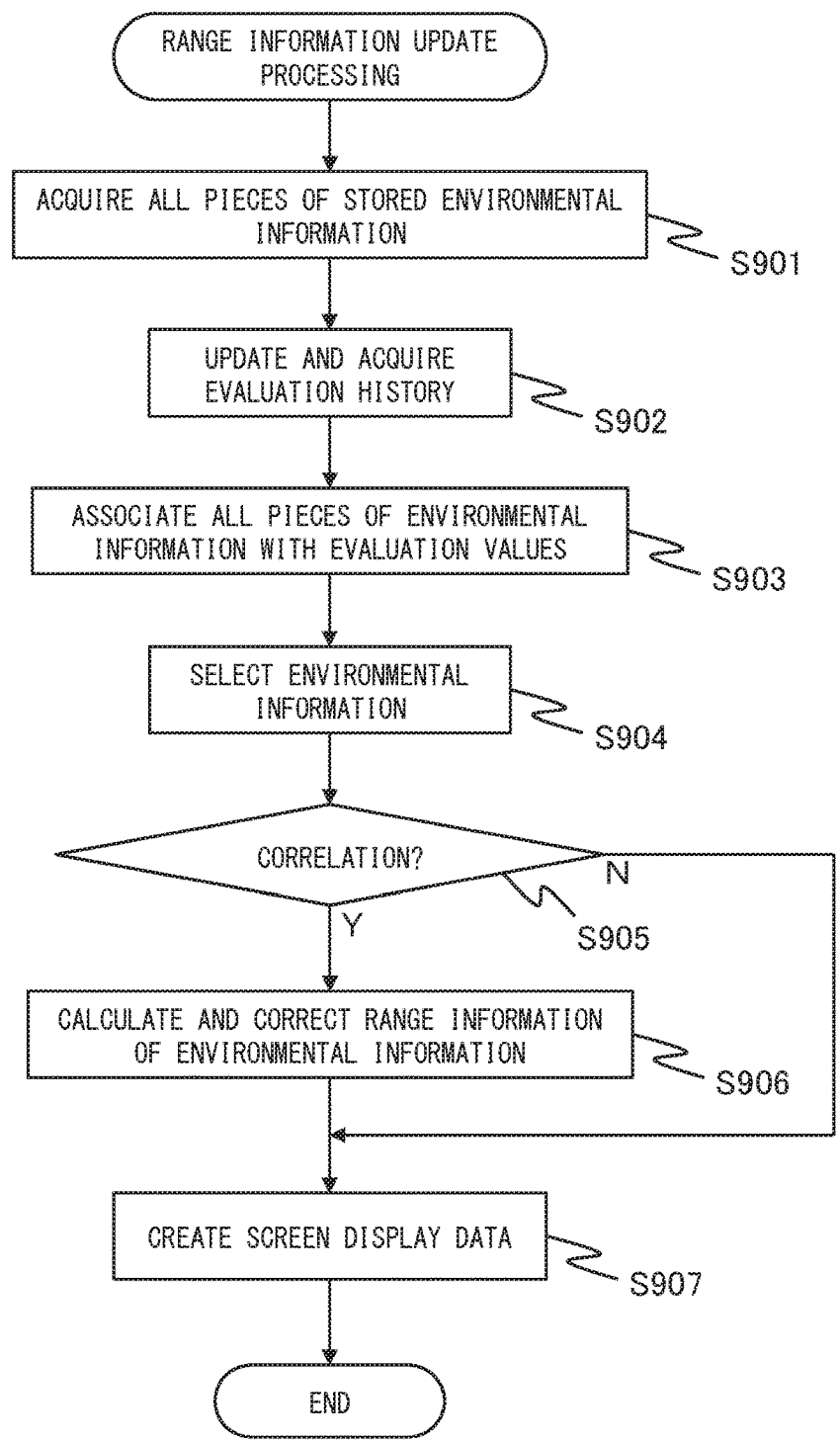
FIG. 16 is a flowchart illustrating exemplary range information update processing.

FIG. 16 is a flowchart illustrating an exemplary operation sequence of range information update processing by the specifying unit 538 and the screen creation unit 533. The range information update processing illustrated in FIG. 16 is performed in step S802 of FIG. 15.

First, the specifying unit 538 looks up the sensor management table to acquire environmental information for each growth stage included in each record among pieces of environmental information of all records associated with the sensor ID and the crop ID included in the harvest data received by the server reception unit 531 (step S901). The environmental information acquired in step S901 is related to, but not limited to, the sensor ID included in the harvest data received by the server reception unit 531. For example, the specifying unit 538 may acquire pieces of environmental information of all records associated with all sensor IDs stored in the server storage unit 52 and also associated with the crop ID. The specifying unit 538 may even classify agricultural fields into groups based on, e.g., the latitude and longitude, the height above sea level, the climate conditions, and the type of soil in each agricultural field and acquire pieces of environmental information of all records associated with a sensor ID corresponding to an agricultural field classified into the same group as that of an agricultural field corresponding to the sensor ID included in the harvest data received by the server reception unit 531 and also associated with the crop ID.

The specifying unit 538 performs update processing for acquiring the sensor ID and the crop evaluation value and growth duration included in the harvest data received by the server reception unit 531, associating them with the acquired sensor ID, and storing the acquired crop evaluation value and growth duration in the evaluation history table, and looks up the evaluation history table after the update processing to acquire all evaluation histories associated with the sensor ID included in the harvest data received by the server reception unit 531 (step S902).

The specifying unit 538 associates all pieces of environmental information acquired in step S901 with evaluation values associated with a growth duration including the measurement times of these pieces of environmental information, for each growth stage (step S903). A data set obtained by associating an evaluation value and pieces of environmental information with each other will be referred to as an environmental information history D hereinafter.

The specifying unit 538 selects environmental information having a great influence on the evaluation value from environmental information histories D (step S904). First, the specifying unit 538 performs principal component analysis using the pieces of environmental information of the environmental information histories D as variables to calculate a principal component loading (factor loading) for each variable in the first principal component. The specifying unit 538 selects a variable (environmental information) having a principal component loading greater than a predetermined value. The specifying unit 538 may select not only the principal component loadings on the first principal component, but also a variable having principal component loadings on the second principal component greater than a predetermined value. When the contribution ratio of the first principal component is lower than a given value, the range information update processing may be ended without executing subsequent steps S905 to S907. When only a few types of environmental information of the environmental information histories D (e.g., three or fewer types of environmental information) are available, the process may advance to step S905 without executing step S904.

The specifying unit 538 determines whether the evaluation value in the selected environmental information history D and the environmental information have a specific correlation between them (step S905). The correlation between the evaluation value and the environmental information will be described below.

Figure 17:
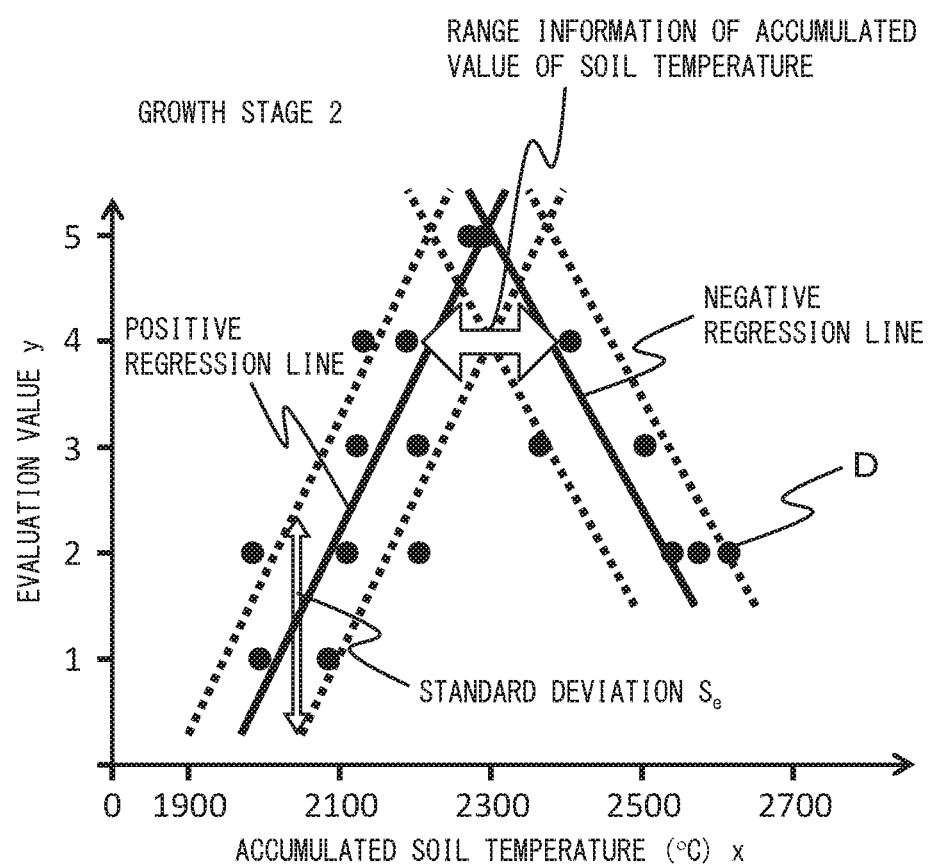
FIG. 17 is a schematic graph illustrating an example of an environmental information history D and a two-dimensional plane having the evaluation value and the environmental information as its axes.

FIG. 17 is a schematic graph illustrating an environmental information history D mapped onto a two-dimensional plane having the evaluation value and the environmental information as its axes. The environmental information illustrated in FIG. 17 uses the accumulated value of the soil temperature, but it may use the accumulated values of other environmental factors (e.g., the ambient temperature or the amount of solar radiation). Generally, a crop is known to be preferably bred within the range of optimum environmental information in each growth stage to harvest a crop having a high evaluation value. For example, as illustrated in FIG. 17, a crop having a high evaluation value is harvested at accumulated soil temperatures around 2,300° C. The lower the accumulated soil temperature from 2,300° C., the lower the evaluation value of a harvested crop, and the higher the accumulated soil temperature from 2,300° C., the lower the evaluation value of a harvested crop again.

Letting $x_i$ be the accumulated soil temperature, $y_i$ be the evaluation value, and X and Y be the averages of $x_i$ and $y_i$, the coefficient of correlation $R_{xy}$ is given by equation (1) where n is the number of data of the environmental information history D.

[Mathematical 1]

$$R_{xy} = \frac{\sum_{i=1}^{n}(x_i - X)(y_i - Y)}{\sqrt{\sum_{i=1}^{n}(x_i - X)^2}\sqrt{\sum_{i=1}^{n}(y_i - Y)^2}} \quad (1)$$

A regression line is given by equation (2).

[Mathematical 2]

$$y = ax + b \quad (2)$$

In this case, a and b are given by equations (3) and (4), respectively.

[Mathematical 3]

$$a = \frac{\sum_{i=1}^{n}(x_i - X)(y_i - Y)}{\sum_{i=1}^{n}(x_i - X)^2} \quad (3)$$

[Mathematical 4]

$$b = Y - aX \quad (4)$$

The standard deviation Se of estimated value of the evaluation value y is given by equation (5).

[Mathematical 5]

$$S_e = \sqrt{\frac{1}{n-2}\left\{\sum_{i=1}^{n}(y_i - Y)^2 - \frac{\left[\sum_{i=1}^{n}(x_i - X)(y_i - Y)\right]^2}{\sum_{i=1}^{n}(x_i - X)^2}\right\}} \quad (5)$$

Referring back to FIG. 16, in step S905, the specifying unit 538 calculates a regression line describing a positive correlation and a regression line describing a negative correlation between the evaluation value and the environmental information and determines that the evaluation value and the environmental information have a specific correlation between them when the absolute value of the coefficient of correlation $R_{xy}$ according to the calculated regression line is 0.8 or more.

When the specifying unit 538 determines that the evaluation value and the environmental information have no specific correlation between them (No in step S905), it advances the process to step S907.

When the specifying unit 538 determines that the evaluation value and the environmental information have a specific correlation between them (Yes in step S905), it calculates a lower limit for the environmental information corresponding to each evaluation value in accordance with the regression line describing a positive correlation and also calculates an upper limit for the environmental information corresponding to each evaluation value in accordance with the regression line describing a negative correlation. The specifying unit 538 updates and stores the calculated lower and upper limits corresponding to each evaluation value as the range information of the environmental information in the range management table stored in the server storage unit 52 (step S906).

The screen creation unit 533 creates management screen display data for displaying a management screen including a notification indicating that the range information of the environmental information in the range management table has been updated (step S907). The screen creation unit 533 passes the created management screen display data to the server transmission unit 534 and ends a series of steps.

The specifying unit 538 may determine whether the first principal component score in principal component analysis performed in step S904 and the evaluation value have a specific correlation between them. First, the specifying unit 538 performs principal component analysis using the pieces of environmental information of the environmental information histories D as variables to calculate a first principal component score corresponding to each variable (environmental information). The specifying unit 538 calculates a coefficient of correlation $R_{xy}$ upon defining the first principal component score as $x_i$, the evaluation value associated with a variable (environmental information) corresponding to the first principal component score as $y_i$, and the averages of $x_i$ and $y_i$ as X and Y in equation (1). The specifying unit 538 calculates a regression line describing a positive correlation and a regression line describing a negative correlation between the evaluation value and the first principal component score in accordance with equations (2) to (5), and determines that the evaluation value and the first principal component score have a specific correlation between them when the absolute value of the coefficient of correlation $R_{xy}$ according to the calculated regression line is 0.8 or more. When the specifying unit 538 determines that the evaluation value and the first principal component score have a specific correlation between them, it calculates a lower limit for the first principal component score corresponding to each evaluation value in accordance with the regression line describing a positive correlation and also calculates an upper limit for the first principal component score corresponding to each evaluation value in accordance with the regression line describing a negative correlation. The specifying unit 538 multiplies the calculated lower and upper limits corresponding to each evaluation value by a matrix inverse to an eigenvector calculated by principal component analysis and updates and stores the upper and lower limits corresponding to each variable (environmental information) selected in step S904 as the range information of each piece of environmental information in the range management table stored in the server storage unit 52. This can calculate range information for pieces of environmental information which influence the evaluation value of a harvested crop.

As described above, with the agricultural management system 1, the server 5 can provide management information for a crop suited to each agricultural field, based on the outcome value and the environmental information history of a crop harvested in the past, in this agricultural field. Therefore, the server 5 can manage an environment suitable for crop breeding for each agricultural field.

The screen creation unit 533 of the server 5 may create display data for displaying a screen including agricultural field environment characteristic curves obtained by plotting the accumulated values of the soil temperature and the amount of solar radiation of each record stored in the sensor management table onto a two-dimensional plane having the accumulated soil temperature and the accumulated amount of solar radiation as its axes, and the server transmission unit 534 may transmit the display data to the portable terminal 4 via the server communication unit 51.

Figure 18:
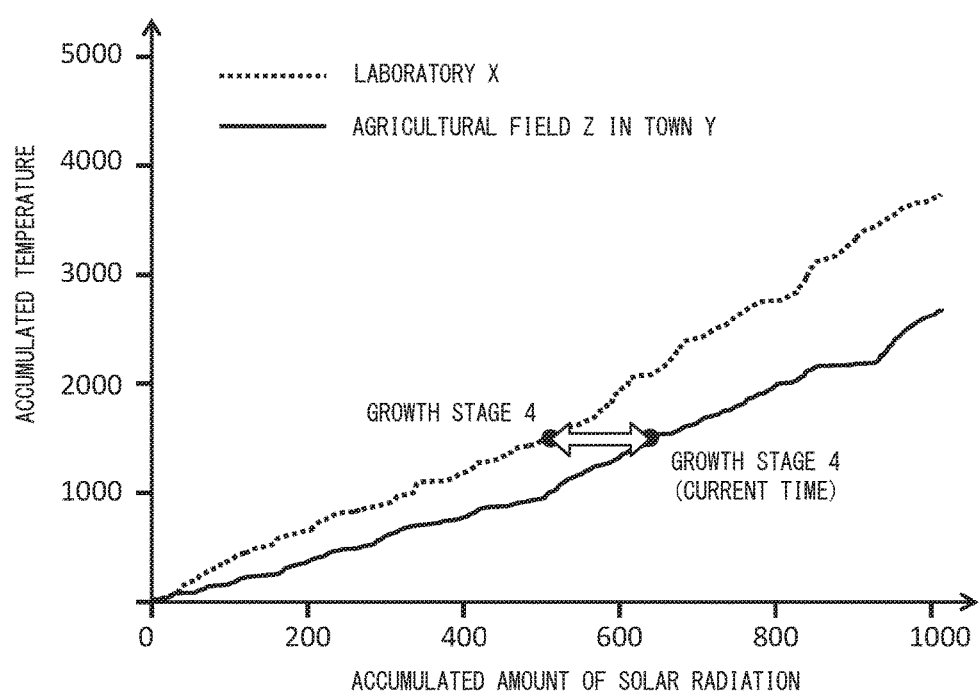
FIG. 18 is a schematic graph illustrating agricultural field environment characteristic curves indicated on a two-dimensional plane having the accumulated soil temperature and the accumulated amount of solar radiation as its axes.

FIG. 18 is a schematic graph illustrating agricultural field environment characteristic curves indicated on a two-dimensional plane having the accumulated soil temperature and the accumulated amount of solar radiation as its axes. FIG. 18 represents an agricultural field environment characteristic curve in laboratory X in which a crop having a specific evaluation value of 5 has been harvested, and an agricultural field environment characteristic curve in agricultural field Z of town Y in which a specific crop is bred. This allows visual observation of the discrepancy between the current agricultural field environment characteristic curve in agricultural field Z of town Y and the agricultural field environment characteristic curve in laboratory X.

The use of agricultural field environment characteristic curves allows determination of a type and species currently optimum in agricultural field Z of town Y and multidimensional analysis of flowering and harvest dates.

FIG. 19 is a chart illustrating still another exemplary operation sequence associated with the agricultural management system 1. The operation sequence illustrated in FIG. 19 exemplifies image evaluation processing shared between the portable terminal 4 and the server 5. The agricultural management system 1 that executes the operation sequence illustrated in FIG. 19 exemplifies an image evaluation system which executes an image evaluation method.

The following operation sequence is executed mainly by the terminal processing unit 47 and the server processing unit 53 in cooperation with the elements of the portable terminal 4 and the server 5, based on the programs stored in the terminal storage unit 43 and the server storage unit 52 in advance. The server storage unit 52 stores a disease and insect damage image management table which stores, e.g., disease or insect damage images, the name of disease or insect damage, the name of a crop, an occurrence site, and occurrence environmental information in association with each other, for each type of disease or insect damage. The name of a crop means the name of a crop suffering from disease or insect damage. Disease or insect damage images are stored in association with each type of disease or insect damage, but only one disease or insect damage image may be stored in association with each type of disease or insect damage. The occurrence site means a crop site suffering from disease or insect damage. The occurrence environmental information means data representing the range of environmental information or the conditions of an agricultural field, in which disease or insect damage easily occurs. One or more types of environmental information may be used for the occurrence environmental information.

First, the acquisition unit 472 acquires a captured image of disease or insect damage obtained by image capturing of the image capture unit 46 in accordance with operation using the operation unit 44 by the user of the portable terminal 4 (step S1001). The captured disease or insect damage includes, e.g., an insect inhabiting an agricultural field run by the user who owns the portable terminal 4, or symptoms of a disease of a crop bred in the agricultural field.

The terminal transmission unit 473 of the portable terminal 4 transmits an image evaluate request including the captured image of disease or insect damage obtained by image capturing of the image capture unit 46 of the portable terminal 4 and the user ID of the user who owns the portable terminal 4 to the server 5 via the second wireless communication unit 42 (step S1002).

When the server reception unit 531 of the server 5 receives via the server communication unit 51, the image evaluate request transmitted from the portable terminal 4, the image evaluation unit 539 and the screen creation unit 533 perform captured image evaluation processing (step S1003). The captured image evaluation processing will be described in detail later.

When captured image evaluation processing is performed by the image evaluation unit 539 and the screen creation unit 533, the server transmission unit 534 receives evaluation result screen display data from the screen creation unit 533 and transmits the evaluation result screen display data to the portable terminal 4 (step S1004).

The browsing execution unit 471 of the portable terminal 4 displays an evaluation result screen (not illustrated) including an evaluation result name, based on the evaluation result screen display data received via the second wireless communication unit 42 (step S1005).

FIG. 20 is a flowchart illustrating an exemplary operation sequence of captured image evaluation processing by the image evaluation unit 539 and the screen creation unit 533. The captured image evaluation processing illustrated in FIG. 20 is performed in step S1003 of FIG. 19.

First, the image evaluation unit 539 acquires disease or insect damage images stored in the disease and insect damage image management table and extracts feature points for each acquired disease or insect damage image, using a local feature amount extraction method such as the SURF method, to calculate a local feature amount for each feature point (step S1101). The local feature amount extraction method is not limited to the SURF method, and the SIFT (Scale-Invariant Feature Transform) method, for example, may also be used. The local feature amount calculated by the local feature amount extraction method has 128 dimensions, but it may also have 64 dimensions or a different number of dimensions without being limited to this example.

The image evaluation unit 539 represents each disease or insect damage image using feature vectors, based on the local feature amounts calculated for each disease or insect damage image (step S1102). The processing for representing a disease or insect damage image using feature vectors is performed using a method for representation by feature vectors such as Fisher vectors. When the code book size in the Fisher vector is 10 and the local feature amount has 128 dimensions, the number of elements of the Fisher vector is $(2 \times 128) \times 10 - 1 = 2559$.

The image evaluation unit 539 generates a classification model based on the feature vectors representing each disease or insect damage image (step S1103). The classification model uses, e.g., decision trees in Random Forest. The classification model may be expressed by an objective function introducing a slack variable when feature vectors representing each disease or insect damage image are used as learning data in Soft Margin Support Vector Machine.

The image evaluation unit 539 extracts feature points using a local feature amount extraction method for a captured image included in the image evaluate request received by the server reception unit 531 to calculate a local feature amount for each feature point (step S1104).

The image evaluation unit 539 represents the captured image using feature vectors, based on the local feature amounts calculated for the captured image (step S1105).

The image evaluation unit 539 assigns points in association with the name of disease or insect damage similar to the feature vectors representing the captured image, based on the generated classification model (step S1106). The point means, e.g., the number of votes for the name of disease or insect damage corresponding to a disease or insect damage image decided for each decision tree in Random Forest. The point also acts as a parameter for controlling the penalty of the slack variable $\xi$ and the distribution of the margin size in Soft Margin Support Vector Machine.

The image evaluation unit 539 weights any point associated with the name of disease or insect damage (step S1107). The weighting processing will be described hereinafter. First, the image evaluation unit 539 looks up the user management table to acquire a sensor ID associated with a user ID included in the image evaluate request received by the server reception unit 531. The image evaluation unit 539 then looks up the sensor management table to acquire environmental information and a crop ID of a record in a predetermined duration associated with the acquired sensor ID. The predetermined duration is defined as one year, but it may be defined as the growth duration of a crop corresponding to the crop ID associated with the sensor ID. The image evaluation unit 539 then looks up the disease and insect damage image management table to extract occurrence environmental information associated with the acquired crop ID to determine whether the acquired environmental information is included in the extracted occurrence environmental information. When the image evaluation unit 539 determines that the acquired environmental information is included in the extracted occurrence environmental information, it looks up the disease and insect damage image management table to specify the name of disease or insect damage associated with the occurrence environmental information determined to include the acquired environmental information and weights the point of the specified name of disease or insect damage. Examples of the processing for weighting the point may include processing for multiplying the point by 1.2.

The image evaluation unit 539 compares the points associated with the names of respective types of disease or insect damage to determine the name of disease or insect damage assigned with the highest point as an evaluation result name (step S1108).

The screen creation unit 533 creates evaluation result screen display data including the evaluation result name determined by the image evaluation unit 539 (step S1109), passes the created evaluation result screen display data to the server transmission unit 534, and ends a series of steps.

As described above, with the image evaluation system, the server 5 can search for not only image information of disease or insect damage accumulated in advance, but also disease or insect damage based on environmental information in an agricultural field. Therefore, the server 5 can improve the accuracy of evaluation of a captured image of disease or insect damage.

A captured image of disease or insect damage obtained by image capturing of the image capture unit 46 in accordance with operation using the operation unit 44 by the user of the portable terminal 4 may be provided by cutting only part of disease or insect damage in accordance with operation using the operation unit 44 by this user. When the portable terminal 4 transmits an image evaluate request including an image of only part of disease or insect damage to the server 5, and the server 5 performs image evaluation processing using the image, since the image has a relatively small partial region other than the disease or insect damage, the accuracy of the image evaluation processing can be improved.

When the portable terminal 4 transmits an image evaluate request including a captured image of disease or insect damage to the server 5, the name of a crop and an occurrence site of disease or insect damage input in accordance with operation using the operation unit 44 by the user of the portable terminal 4, for example, may be included in the image evaluate request. In this case, in step S1101, disease or insect damage images acquired from the disease and insect damage image management table are determined as disease or insect damage images corresponding to the name of a crop and/or the occurrence site included in the image evaluate request. This can determine disease or insect damage images corresponding to a crop and/or an occurrence site suffering from disease or insect damage as objects to be evaluated, thus improving the accuracy of image evaluation processing.

In the weighting processing, a sensor ID is acquired from the user management table using, as a key, a user ID included in the image evaluate request received by the server reception unit 531, but it may also be acquired based on the position of the portable terminal 4 having transmitted the image evaluate request. In this case, the portable terminal 4 includes a GPS unit (not illustrated) which detects the position (e.g., the latitude, the longitude, and the altitude) of the portable terminal 4. First, in step S1001 of FIG. 19, the acquisition unit 472 of the portable terminal 4 acquires the position (e.g., the latitude, the longitude, and the altitude) detected by the GPS unit as an image capture position upon acquiring a captured image of disease or insect damage by image capturing of the image capture unit 46 in accordance with operation using the operation unit 44 by the user of the portable terminal 4. In step S1002 of FIG. 19, the terminal transmission unit 473 of the portable terminal 4 transmits to the server 5 via the second wireless communication unit 42, an image evaluate request including the captured image of disease or insect damage obtained by image capturing of the image capture unit 46 of the portable terminal 4, the image capture position, and the user ID of the user who owns the portable terminal 4. In step S1107 of FIG. 20, the image evaluation unit 539 looks up the sensor management table to acquire a sensor ID associated with a sensor position near the image capture position received by the server reception unit 531. Thus, the user can evaluate an image even in an area other than an agricultural field run by him or her.

Further, in the weighting processing, the server 5 may acquire from the portable terminal 4 having transmitted the image evaluate request, a sensor ID directly acquired from the sensor terminal 2 by the portable terminal 4. In this case, the portable terminal 4 having transmitted the image evaluate request establishes communication with a sensor terminal 2 located within the radio propagation range by short-range wireless communication between terminals such as Bluetooth® to directly acquire a sensor ID from the sensor terminal 2 having established communication. The portable terminal 4 includes a short-range wireless communication unit 48, in addition to the units illustrated in FIG. 5. The short-range wireless communication unit 48 includes an interface circuit for performing short-range wireless communication in accordance with a communication scheme such as Bluetooth®. The acquisition unit 472 of the portable terminal 4 specifies a sensor terminal 2 located within a predetermined range communicable via the short-range wireless communication unit 48 and transmits a sensor ID request signal to the sensor terminal 2. Upon receiving the sensor ID request signal from the portable terminal 4, the sensor terminal processing unit 26 of the sensor terminal 2 acquires its own sensor ID stored in the sensor terminal storage unit 22 and transmits the acquired sensor ID to the portable terminal 4 having transmitted the sensor ID request signal. The terminal transmission unit 473 of the portable terminal 4 further includes the received sensor ID in the image evaluate request and transmits the image evaluate request to the server 5. Thus, even when the accuracy of a positioning system using, e.g., GPS mounted in the portable terminal 4 is poor, the sensor ID of a sensor terminal 2 located around the portable terminal 4 can be acquired.

In the weighting processing, image evaluation processing may be performed based on the information of currently occurring disease or insect damage. In this case, the server reception unit 531 of the server 5 receives the name of disease or insect damage recognized to have occurred in each agricultural field from each user running this agricultural field, and the acquisition unit 472 of the server 5 stores in the server storage unit 52, a disease and insect damage occurrence table which stores this name of disease or insect damage in association with the agricultural field ID of an agricultural field suffering from disease or insect damage. In step S1107 of FIG. 20, the image evaluation unit 539 looks up the sensor management table to acquire an agricultural field ID associated with a sensor position near the image capture position received by the server reception unit 531. The image evaluation unit 539 looks up the disease and insect damage occurrence table to acquire the name of disease or insect damage associated with the agricultural field ID and weights the point of the acquired name of disease or insect damage. This allows image evaluation based on disease or insect damage occurring in an agricultural field around an agricultural field run by the user himself or herself, thus improving the accuracy of evaluation of a captured image of disease or insect damage.

As the information of currently occurring disease or insect damage, occurring disease or insect damage data acquired from an external server, or occurring disease or insect damage data registered by the server administrator of the image evaluation system may be used. In this case, the server storage unit 52 associates the name of occurring disease or insect damage recognized to be currently occurring and the occurrence position information of the position where disease or insect damage is occurring with each other and stores them. The portable terminal 4 includes a GPS unit (not illustrated) which detects the position (e.g., the latitude, the longitude, and the altitude) of the portable terminal 4. First, in step S1001 of FIG. 19, the acquisition unit 472 of the portable terminal 4 acquires the position (e.g., the latitude, the longitude, and the altitude) detected by the GPS unit as an image capture position upon acquiring a captured image of disease or insect damage by image capturing of the image capture unit 46 in accordance with operation using the operation unit 44 by the user of the portable terminal 4. In step S1002 of FIG. 19, the terminal transmission unit 473 of the portable terminal 4 transmits to the server 5 via the second wireless communication unit 42, an image evaluate request including the captured image of disease or insect damage obtained by image capturing of the image capture unit 46 of the portable terminal 4, the image capture position, and the user ID of the user who owns the portable terminal 4. In step S1107 of FIG. 20, the image evaluation unit 539 determines whether the acquired image capture position falls within a predetermined range having the occurrence position information stored in the server storage unit 52 as its center. When the image evaluation unit 539 determines that the image capture position falls within the predetermined range, it specifies the name of occurring disease or insect damage corresponding to the occurrence position information and weights the point of the specified name of disease or insect damage. Thus, the user can evaluate an image based on occurring disease or insect damage data currently occurring all over the country.

The image evaluation processing by the image evaluation system may also be used to evaluate an animal or plant species other than disease or insect damage. Examples of the animal or plant species may include a plant, an animal, and an insect. In this case, first, the server 5 stores animal or plant species images corresponding to respective animal or plant species, and occurrence environmental information representing the range of environmental information in which this animal or plant species easily occurs. The server 5 receives a captured image transmitted from the portable terminal 4. The server 5 searches for an animal or plant species image similar to the captured image received from the portable terminal 4 among the stored animal or plant species images and assigns a point to the name of each animal or plant species based on the found animal or plant species image. A point is assigned by the image evaluation unit 539. The server 5 receives environmental information measured by the sensor terminal 2 from the sensor terminal 2. The server 5 specifies the environmental information in any agricultural field received from the sensor terminal 2 to evaluate occurrence environmental information including the specified environmental information. The server 5 extracts the name of an animal or plant species associated with the occurrence environmental information determined to include the specified environmental information and weights a point corresponding to the extracted name of an animal or plant species. The server 5 may store positional information in which an animal or plant species easily inhabits and weight a point corresponding to the name of an animal or plant species based on the positional information and the image capture position. The server 5 transmits the name of an animal or plant species corresponding to the highest point among points corresponding to the name of each animal or plant species to the portable terminal 4 as an evaluation result name. Thus, the user can know, as an evaluation result name, the name of an animal or plant species based on image classification using an image of the animal or plant species captured by the portable terminal 4, simply by transmitting the captured image of the animal or plant species to the server 5.

It will be understood by those skilled in the art that various changes, substitutions, and alterations can be made therein without departing from the spirit and scope of the present invention.

REFERENCE SIGNS LIST 1 agricultural management system
2 sensor terminal
21 sensor terminal communication unit
22 sensor terminal storage unit
23 GPS unit
24 sensor connection unit
25 sensor unit
26 sensor terminal processing unit
261 measured information acquisition unit
262 measured information transmission unit
3 sensor base station
31 first base station communication unit
32 second base station communication unit
33 base station storage unit
34 GPS unit
35 sensor connection unit 36 sensor unit
37 base station processing unit
371 measured information acquisition unit
372 environmental information reception unit
373 environmental information transmission unit
4 portable terminal
41 first wireless communication unit
42 second wireless communication unit
43 terminal storage unit
44 operation unit
45 display unit
46 image capture unit
47 terminal processing unit
471 browsing execution unit
472 acquisition unit
473 terminal transmission unit
5 server
51 server communication unit
52 server storage unit
53 server processing unit
531 server reception unit
532 registration unit
533 screen creation unit
534 server transmission unit
535 storage processing unit
536 warning unit
537 correction unit
538 specifying unit
539 image evaluation unit

What is claimed is:

1. An image evaluation method using a server for communicating with a portable terminal and a sensor terminal located in an agricultural field, the server including a storage unit, the method comprising the steps of, executed by the server:
   for each of animal or plant species, storing in the storage unit, animal or plant species images corresponding to respective animal or plant species, and occurrence environmental information representing a range of environmental information in which the respective animal or plant species occurs;
   storing in the storage unit, crop information corresponding to a crop cultivated in the agricultural field and environmental information transmitted from the sensor terminal, the crop information and the environmental information associated with the sensor terminal;
   receiving a captured image transmitted from the portable terminal;
   receiving the environmental information measured by the sensor terminal from the sensor terminal;
   for each of the animal or plant species images, generating a classification model for a feature vector corresponding to a local feature amount for each feature point in each of the animal or plant species images, and generating the feature vector corresponding to the local feature amount for the captured image;
   assigning a point to a name of each animal or plant species based on the classification model for corresponding animal or plant species images and the feature vector for the captured image;
   extracting the crop information corresponding to the crop cultivated in the agricultural field, the crop information associated with the sensor terminal;
   extracting the occurrence environmental information associated with the extracted crop information;
   determining whether or not the extracted occurrence environmental information includes the received environmental information from the sensor terminal;
   when it is determined that the extracted occurrence environmental information includes the received environmental information from the sensor terminal, extracting the name of the animal or plant species corresponding to the extracted occurrence environmental information, and weighting the a point of the extracted name; and
   transmitting a name having a highest point of the points to the portable terminal as an evaluation result name.

2. The image evaluation method according to claim 1, wherein in the step of weighting, the server extracts the names of the animal or plant species associated with the occurrence environmental information comprising the environmental information received from a sensor terminal near an image capture position of the portable terminal when the animal or plant species is captured by the portable terminal.

3. The image evaluation method according to claim 2, further comprising the step of, executed by the server:
   storing in the storage unit, the names of the animal or plant species in association with an agricultural field recognized to have the animal or plant species,
   wherein in the step of weighting, the server extracts the names of the animal or plant species recognized in a different agricultural field around the agricultural field in which the sensor terminal near the image capture position is located, and further weights the points of the extracted names.

* * * * *

UNITED STATES PATENT AND TRADEMARK OFFICE
CERTIFICATE OF CORRECTION

PATENT NO. : 10,262,244 B2
APPLICATION NO. : 15/760561
DATED : April 16, 2019
INVENTOR(S) : Norio Yamaguchi et al.

It is certified that error appears in the above-identified patent and that said Letters Patent is hereby corrected as shown below:

In the Claims

Column 30, Line 26, Claim 1    delete "the a" and insert -- the --

Signed and Sealed this
Fifth Day of May, 2020

Andrei Iancu
*Director of the United States Patent and Trademark Office*